US008833238B2

(12) United States Patent
Hansen et al.

(10) Patent No.: US 8,833,238 B2
(45) Date of Patent: Sep. 16, 2014

(54) BEVERAGE PREPARATION MACHINES

(75) Inventors: Nick Andrew Hansen, Banbury (GB); Andrew Bentley, Banbury (GB)

(73) Assignee: Kraft Foods R&D, Inc., Deerfield, IL (US)

( * ) Notice: Subject to any disclaimer, the term of this patent is extended or adjusted under 35 U.S.C. 154(b) by 18 days.

(21) Appl. No.: 13/318,050

(22) PCT Filed: Apr. 16, 2010

(86) PCT No.: PCT/GB2010/000784
§ 371 (c)(1),
(2), (4) Date: Mar. 1, 2012

(87) PCT Pub. No.: WO2010/125329
PCT Pub. Date: Nov. 4, 2010

(65) Prior Publication Data
US 2012/0156336 A1 Jun. 21, 2012

(30) Foreign Application Priority Data
May 1, 2009 (GB) .................................... 09076118

(51) Int. Cl.
A47J 31/44 (2006.01)
A47J 31/06 (2006.01)
A47J 31/36 (2006.01)
A47J 31/40 (2006.01)

(52) U.S. Cl.
CPC .......... *A47J 31/3695* (2013.01); *A47J 31/0621* (2013.01); *A47J 31/4492* (2013.01); *A47J 31/4496* (2013.01); *A47J 31/0605* (2013.01); *A47J 31/407* (2013.01)
USPC .................................. 99/283; 99/295; 99/300

(58) Field of Classification Search
CPC .............. A47J 31/0605; A47J 31/0621; A47J 31/3695; A47J 31/407; A47J 31/4492; A47J 31/4496

USPC ............................................ 426/231; 99/283
See application file for complete search history.

(56) References Cited

U.S. PATENT DOCUMENTS 4,210,312 A 7/1980 Hanson
6,382,083 B2 * 5/2002 Schmed ...................... 99/289 R
(Continued)

FOREIGN PATENT DOCUMENTS

EP 0334572 9/1989
EP 0389141 9/1990
(Continued)

OTHER PUBLICATIONS

Search Report dated Aug. 21, 2009, from corresponding United Kingdom Application No. GB0907611.8 (2 pages).
(Continued)

*Primary Examiner* — Jianying Atkisson
(74) *Attorney, Agent, or Firm* — Fitch, Even, Tabin & Flannery LLP

(57) ABSTRACT

A beverage preparation machine of the type which uses prepackaged containers of beverage ingredients comprises a cartridge recognition device for determining the type of beverage to be prepared from a cartridge inserted into the machine and a variable geometry valve located downstream of a cartridge when inserted in the machine. The valve enables preparation of beverages at a range of pressures by having at least an open position and at least one restricted flow position, and a controller for selecting an initial valve position and controlling the subsequent operation of the valve according to the determination of the type of beverage to be prepared by the cartridge recognition device.

6 Claims, 22 Drawing Sheets

(56) References Cited

U.S. PATENT DOCUMENTS

| | | |
|---|---|---|
| 6,405,637 B1 | 6/2002 | Cai |
| 6,439,105 B1 | 8/2002 | Ford |
| 7,219,599 B2 * | 5/2007 | Geiger ............................ 99/299 |
| 7,726,355 B2 * | 6/2010 | Lemme et al. ................... 141/65 |
| 2001/0022138 A1 | 9/2001 | Schmed |
| 2001/0050002 A1 | 12/2001 | Bonanno |
| 2004/0206245 A1 * | 10/2004 | Halliday et al. ................. 99/337 |
| 2005/0066820 A1 | 3/2005 | Lussi |
| 2006/0089603 A1 | 4/2006 | Truitt et al. |
| 2006/0144244 A1 * | 7/2006 | Girard et al. .................... 99/295 |
| 2006/0174770 A1 | 8/2006 | Jordana |
| 2007/0185434 A1 | 8/2007 | Denisart et al. |
| 2008/0121108 A1 | 5/2008 | Vicker |

FOREIGN PATENT DOCUMENTS

| | | |
|---|---|---|
| EP | 0726053 A1 | 8/1996 |
| EP | 1016364 | 7/2000 |
| EP | 1133944 | 9/2001 |
| EP | 1319357 | 6/2003 |
| EP | 1579792 A1 | 3/2004 |
| EP | 1440644 | 7/2004 |
| EP | 1440644 A1 | 7/2004 |
| EP | 1440903 | 7/2004 |
| EP | 1690479 A | 8/2006 |
| FR | 1330186 | 5/1963 |
| GB | 2469873 A | 3/2010 |

OTHER PUBLICATIONS

International Search Report dated Jul. 1, 2010 for PCT/GB2010/000784.

* cited by examiner

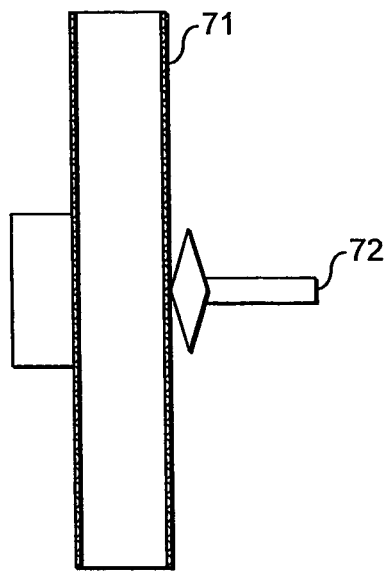
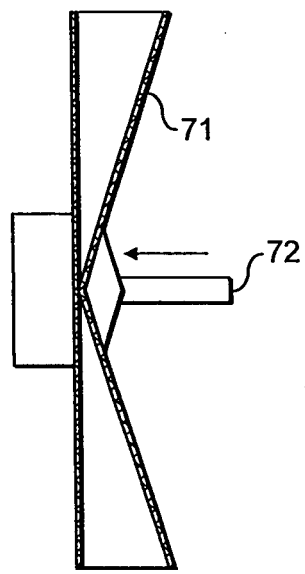
FIG. 14  FIG. 15
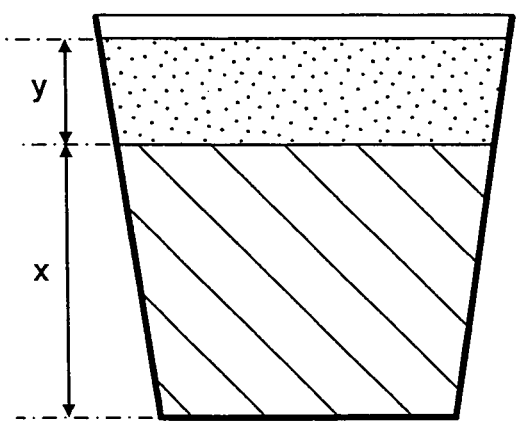
FIG. 16a

| STEP | WATER PUMP STATE/SPEED | AIR PURGE PUMP/PWM | RECIRCULATION VALVE STATE | RESTRICTION BYPASS VALVE STATE | STOP CONDITION/DURATION OF STEP |
|---|---|---|---|---|---|
| Set valves | No change/0 | Stop/0 | Recirculate | Open | Time >=1 second |
| Heat | Stop/0 | Stop/0 | Recirculate | Open | Boiler temperature >=97°C |
| Set valves | No change/0 | No change/0 | Brew | Open | Time >=1 second |
| Remove gas | Run/50 | No change/0 | No change | Open | Time >=2 seconds |
| Set valves | Stop/0 | No change/0 | No change | Closed | Time >=5 seconds |
| Pressure wet | Run/100 | No change/0 | No change | No change | Disc inlet pressure >=2 bar |
| Soak | Stop/0 | No change/0 | No change | No change | Time >=10 seconds |
| Brew | Run/30 | Stop/0 | No change | No change | Time >=32 seconds |
| Stop pump | Stop/0 | Stop/0 | No change | No change | Time >=0.5 seconds |
| Open purge | Stop/0 | Stop/0 | No change | Open | Time >=3 seconds |
| Pause | No change/0 | No change/0 | No change | Open | Time <=1 seconds |
| Air purge | Stop/0 | Run/50 | No change | Open | Time >=8 seconds |
| Pause | Stop/0 | Stop/0 | Recirculate | No change | Time >=2 seconds |
| Reset | Stop/0 | Stop/0 | Recirculate | Closed | Time >=0 seconds |

FIG. 16b

| STEP | WATER PUMP STATE/SPEED | AIR PURGE PUMP/PWM | RECIRCULATION VALVE STATE | RESTRICTION BYPASS VALVE STATE | STOP CONDITION/DURATION OF STEP |
|---|---|---|---|---|---|
| Set valves | No change/0 | Stop/0 | Recirculate | Open | Time >=1 second |
| Heat | Stop/0 | Stop/0 | Recirculate | Open | Boiler temperature >=97°C |
| Set valves | No change/0 | No change/0 | Brew | Open | Time >=1 second |
| Remove gas | Run/70 | No change/0 | No change | Open | Time >=8 seconds |
| Set valves | Stop/0 | No change/0 | No change | Closed | Time >=5 seconds |
| Pressure wet | Run/100 | No change/0 | No change | No change | Disc inlet pressure >=2 bar |
| Soak | Stop/0 | No change/0 | No change | No change | Time >=10 seconds |
| Brew | Run/30 | Stop/0 | No change | No change | Time >=32 seconds |
| Stop pump | Stop/0 | Stop/0 | No change | No change | Time >=0.5 seconds |
| Open purge | Stop/0 | Stop/0 | No change | Open | Time >=3 seconds |
| Pause | No change/0 | Run/50 | No change | Open | Time <=5 seconds |
| Air purge | Stop/0 | No change/0 | No change | Open | Time >=8 seconds |
| Pause | Stop/0 | Stop/0 | Recirculate | Open | Time >=2 seconds |
| Reset | Stop/0 | Stop/0 | Recirculate | Open | Time >=0 seconds |

FIG. 17b

BEVERAGE PREPARATION MACHINES

CROSS REFERENCE TO RELATED APPLICATIONS

This application is a U.S. national phase application of International Application No. PCT/GB2010/000784, filed Apr. 16, 2010, which claims benefit from United Kingdom Application No. 0907611.8, filed May 1, 2009, both of which are hereby incorporated herein by reference in their entirety.

FIELD

The present invention relates to improvements in beverage preparation machines and in particular to a beverage preparation machine of the type which uses pre-packaged containers of beverage ingredients.

BACKGROUND

Coffee houses have been a part of the "coffee culture" since the 17th century. Throughout the years methods of making coffee have been refined and skilled people trained to produce the best coffee beverages. The first coffee machines were developed in the early 1800s and an automatic espresso machine was invented in the 1930s. The automation of the coffee making process has, in turn, lead to a rapid growth, particularly in the last ten years, in the number of coffee houses/shops with more specialist drinks, such as espresso and cappuccino, being in high demand. These types of beverages have historically been regarded as luxury items because of the need for expensive, complex machines capable of producing the high pressures necessary for making them, which had to be properly operated and maintained by a trained barista to produce good quality. Coffee aficionados agree that an espresso can be spoiled by a badly trained operator despite the use of a good quality machine and good quality coffee. This trend, however, has not only lead to an increased demand from consumers for luxury top quality beverages, but also a desire for a greater variety of specialty beverages, and the ability to make such beverages in the comfort of one's own home.

Although there is no agreed technical definition, it is generally understood that, compared to drip coffee, barista quality espresso has a thicker consistency, due to a higher amount of dissolved solids and fine oil droplets suspended throughout the drink. It has a smooth, yet thick, dark reddish brown crema making up 10 to 30% of the beverage. The crema is a polyphasic emulsion of air and the oils, proteins and sugars extracted from the coffee which is produced at a high pressure, traditionally in the region of 9 to 10 bar. The higher pressures increase the rate of coffee wetting and improve extraction as well as being responsible for the development of the crema.

It is acknowledged, by discerning espresso drinkers, that espresso produced using water which is cooler than the optimum temperature tastes sour and that produced with water which is hotter than this temperature tastes bitter. The optimum temperature is claimed to be between 92 and 96° C. Other factors which affect the quality of the espresso include the roasting and age of the coffee beans, the grind size, the compaction of the grinds prior to brewing, and the brew time. The "best" espresso is achieved by balancing these key elements of the brewing process.

Domestic coffee machines have also developed significantly since the first filter machines were invented in the 1960s and coffee machines are now essential pieces of kitchen equipment in many households. Some such machines dispense individual servings of a beverage directly into a drinking receptacle, and derive the beverage from a bulk supply of beverage ingredients or from individual packages of beverage ingredients such as pods, pads or cartridges. In the following specification such packages will be referenced by the general term cartridges. Machines which use such cartridges eliminate the need for cleaning and can enable the user to make a selection of beverages. An example of one type of such cartridge is described in EP-A-1440903. The beverages are formed from brewing, mixing, dissolving or suspending the beverage ingredients in water. For example, for coffee beverages, heated water is forced through the cartridges to form the extracted solution. The use of cartridges in such machines has become increasingly popular due to their convenience and the quality of the beverage produced.

An example of a machine for preparing beverages using this type of cartridge is described in EP-A-1440644. This type of machine provided, inter alia, an improvement over the prior art known at the time in that it operated at a lower pressure than the previously known machines, which were designed for the commercial or industrial markets rather than the domestic market. Hence it was more suitable for the domestic market in terms of cost, reliability and performance. However, the problem that faces systems that operate at a lower pressure is that they are generally not capable of producing barista quality espressos, which require a significantly higher pressure.

With the change in consumer trends, however, there is a desire for domestic machines which are capable of producing barista quality espresso and a range of other beverages, for which no training is necessary, which are affordable and which require little or no cleaning.

Some machines available on the market claim to produce higher quality beverages but for various reasons they are comparatively expensive machines. Examples of such machines are the Gaggia L'Amante™, the Gaggia Evolution™, the Nespresso Delonghi Latissimma 660™, and the Krups XN2101™, which also uses a capsule system.

Most of these machines require specially designed cartridges of increased complexity and a particular specification of materials to cope with the high pressures involved in the brewing process for espresso. These cartridges generally incorporate filters and the process uses the geometry of the cartridge to enable the desired quality of the beverage to be produced under high pressure. This constrains the use of the cartridges in the machine for which it is designed.

It is, however, desirous to provide an improved beverage preparation machine capable of making a selection of beverages, including a premium quality espresso as well as non-espresso beverages, preferably using pre-packed beverage cartridges. The machine may also be a bulk brewer or other non-cartridge machine.

It is also desirous to provide a machine which is backwardly compatible with existing cartridges, such as those described in EP-A-1440903, which are used in existing low pressure beverage preparation machines.

SUMMARY

Accordingly, the present invention provides a beverage preparation machine for preparing beverages from a cartridge containing one or more beverage ingredients, said machine comprising a cartridge recognition device for determining the type of beverage to be prepared from a cartridge inserted into the machine, characterised by the provision of a variable geometry valve located downstream of a cartridge when inserted in the machine, said valve enabling preparation of beverages at a range of pressures by having at least an open position and at least one restricted flow position, and a controller for selecting an initial valve position and controlling the subsequent operation of the valve according to the determination of the type of beverage to be prepared by the cartridge recognition device.

The variable geometry valve preferably additionally has a closed position preventing flow and/or a purge position for diverting purge waste away from a dispensing area.

Preferably the controller is programmed to change the variable geometry valve position during the preparation of the beverage according to pressure and/or flow requirements of the beverage preparation cycle.

The variable geometry valve may be a rotating ball valve or a pinch valve.

The restricted position of the variable geometry valve preferably creates a back pressure in the cartridge of 2 to 9 bar, and preferably 2 to 6 bar.

The invention also provides a method of preparing beverages using a beverage preparation machine for preparing beverages from a cartridge containing one or more beverage ingredients, said machine comprising a variable geometry valve located downstream of a cartridge when inserted in the machine, said valve enabling preparation of beverages at a range of pressures and having at least an open position providing no restriction to the flow of beverage and a restricted flow position, and a cartridge recognition device for determining the type of beverage to be prepared from a cartridge inserted into the machine, the method comprising the steps of determining the type of beverage to be produced from a cartridge, selecting an initial valve position and controlling subsequent operation of the variable geometry valve according to the determination of the type of beverage to be prepared by the cartridge recognition device.

The variable geometry valve position may be changed during a beverage preparation cycle and/or pulsed between positions during a beverage preparation cycle.

BRIEF DESCRIPTION OF THE DRAWINGS

Preferred embodiments of the present invention will now be described, by way of example only, with reference to the accompanying drawings in which:

FIGS. 14 and 15 are cross-sectional side elevations of the valve of FIGS. 13a and 13b;

FIG. 16a is a side elevation of a beverage receptacle containing a coffee beverage having a large volume of crema produced using an improved gas management system;

FIG. 16b is a chart showing the brew parameters used in producing the beverage illustrated in FIG. 16a;

FIG. 17b is a chart showing the brew parameters used in producing the beverage illustrated in FIG. 17a;

DETAILED DESCRIPTION

In order to cater for the desired wide selection of good quality beverage types, having different characteristics, the present invention involves one or more significant improvements to known beverage preparation machines. These improvements enable sufficiently high pressures to be generated and maintained for the production of good quality espressos, and the pressure to be varied in a manner which is invisible to the user and requires no manual intervention. Furthermore they enable the crema to be improved in a way not previously possible.

These improvements, which will be described in more detail below, include:

1. providing a variable geometry valve downstream of the beverage cartridge to enable the beverage preparation machine to operate at a range of pressures; and 2. providing greater control over the end appearance of the dispensed beverage, in particular beverages with crema, by controlling the volume of gas passed through the beverage ingredients.

The aforementioned improvements will be described with reference to a known beverage preparation machine 10 which is illustrated in FIGS. 1 to 7 of the accompanying drawings. It should be noted, however, that the improvements find application in a wide range of beverage preparation machines capable of using a wide range of cartridges which, as noted above, include pods, pads, rigid and semi-rigid cartridges.

Figure 1:
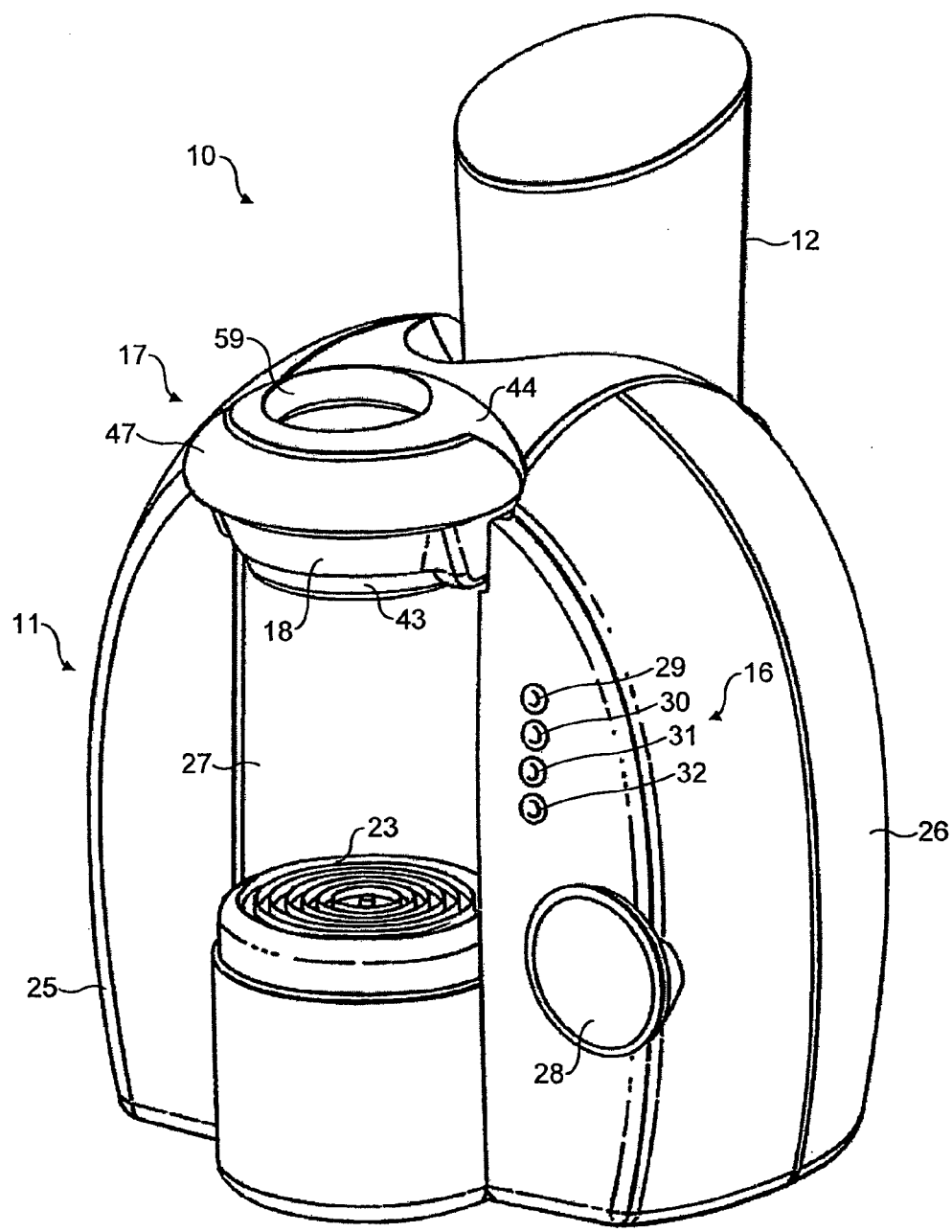
FIG. 1 is a front perspective view of a prior art beverage preparation machine with the cartridge head in a closed position.
Figure 2:
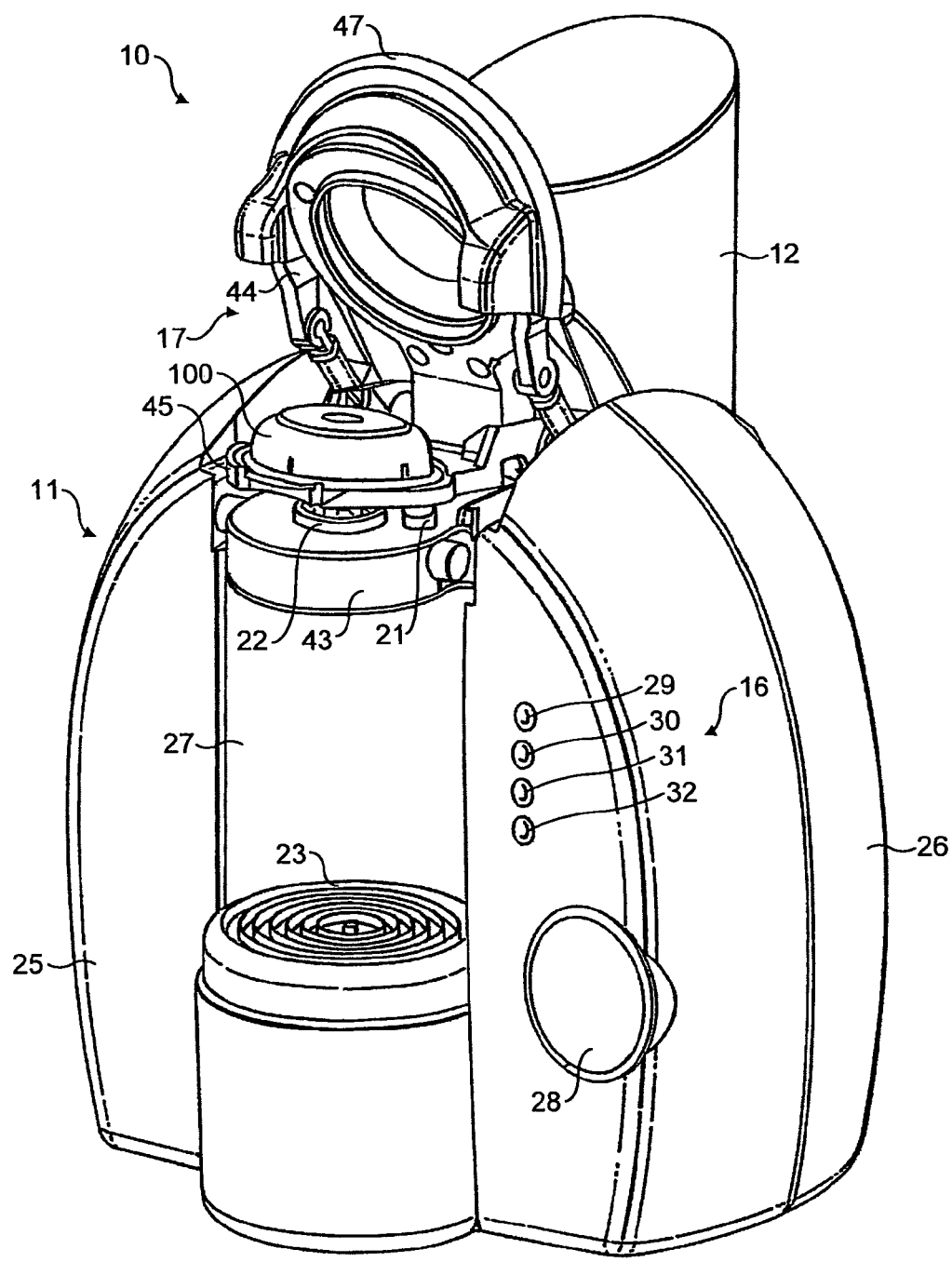
FIG. 2 is a front perspective view of the machine of FIG. 1 with the cartridge head in an open position.
Figure 3:
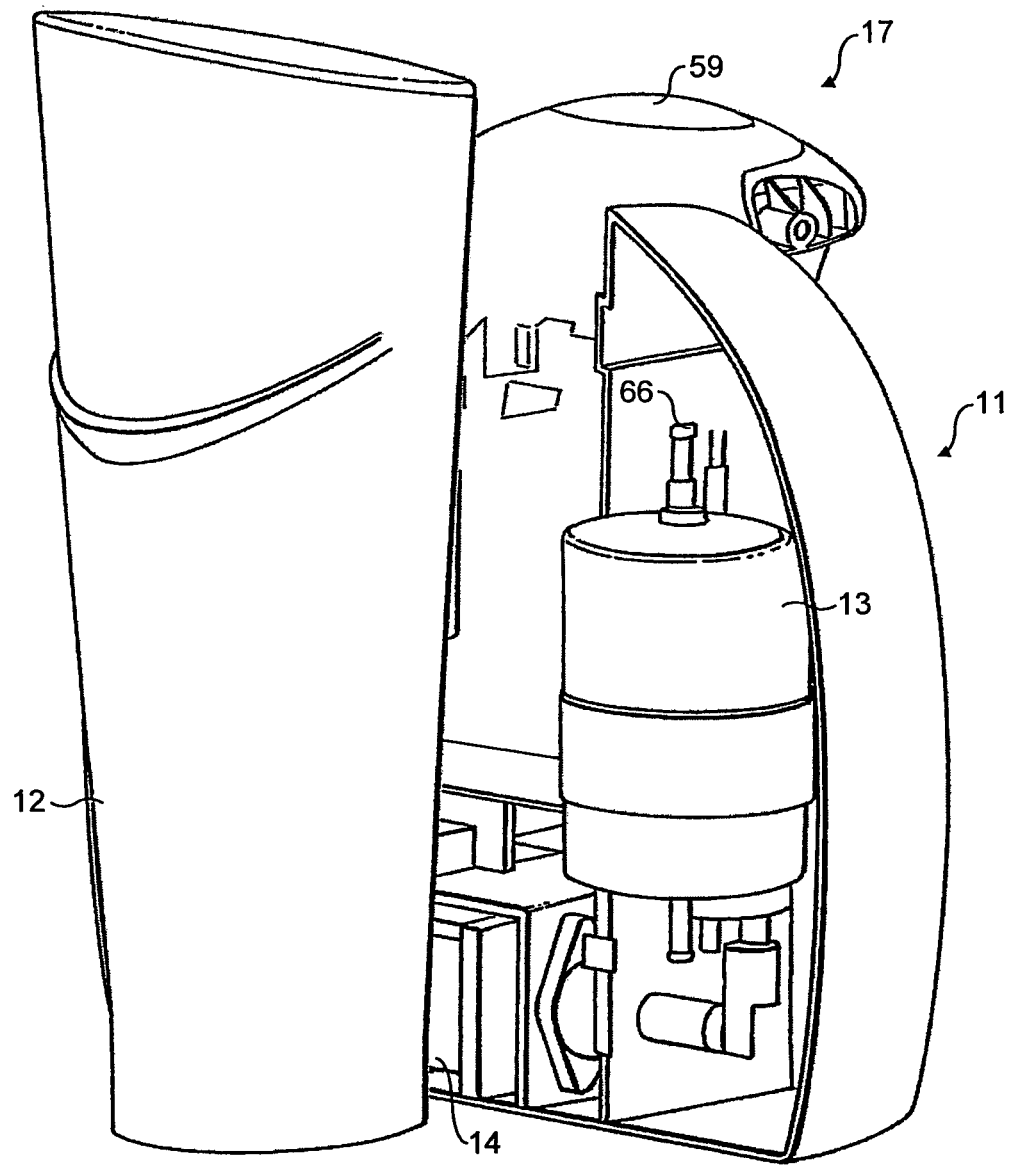
FIG. 3 is a rear elevation of the machine of FIG. 1 with some parts omitted for clarity.

The beverage preparation machine 10 of FIGS. 1 to 3 generally comprises a housing 11, a tank 12, a water heater 13, a control processor (not shown), a user interface 16 and a cartridge head 17. The cartridge head 17 in turn generally comprises a cartridge holder 18 for holding, in use, a beverage cartridge 100 and cartridge recognition means 20. The cartridge head 17 further comprises inlet and outlet piercers 21,22 for forming in the beverage cartridge 100, in use, an inlet 107 for liquid to enter the cartridge 100 and an outlet 108 for the prepared beverage to exit the beverage cartridge 100.

Although water is likely to be the most common liquid used in preparing beverages such as coffee, the machine 10 is also capable of handling other liquids, such as milk or milk preparations, for mixing with the beverage ingredients 200. Any references herein to water should also be taken to include any form of liquid used in preparing beverages.

The housing 11 is preferably made in whole or in part from a suitable plastics material or metal. The housing 11 preferably comprises a clam-shell design having a front half 25 and a rear half 26 which allow access during assembly for fitting of the machine 10 components.

The front half 25 of the housing 11 defines a dispensing station 27 where dispensation of the beverage takes place, which includes a cupstand 23 with a drip tray located beneath. The machine user interface 16 is also located on the front of the housing 11 and comprises a plurality of control switches, for example, a start/stop button 28, and a number of status indicators 29-32. The status indicators 29-32 are preferably light emitting diodes (LED) which, for example, indicate readiness of the machine 10, whether an error has occurred in the machine 10 operation, and the mode of operation of the machine 10. The LEDs 29-32 may be controlled to illuminate at a constant intensity, to flash intermittently, or both depending on the status of the machine 10. The LEDs 29-32 may have a variety of colours including green, red and yellow. The start/stop button 28 controls commencement of the dispense cycle and is preferably a manually operated push-button, switch or similar.

The tank 12 is located to the rear of the housing 11 and is preferably incorporated in, or connected to, the rear half 26 of the housing 11. The tank 12 has an inlet for filling the tank 12 with water, or other liquid, which is closed off when the tank 12 is in position in the machine 10. An outlet is provided towards a lower end of the tank 12 which communicates with the pump 14. The tank 12 may be made from a transparent or translucent material to allow a consumer to view the quantity of water remaining in the tank 12. Alternatively, the tank 12 may be made from an opaque material but have provided a viewing window therein. In addition, or in place of the above, the tank 12 may be provided with a low level sensor which prevents operation of the pump 14 and optionally triggers a warning indicator, such as an LED, when the liquid level in the tank descends to a preselected level. The tank 12 preferably has an internal capacity of approximately 1.5 liters.

Figure 8:
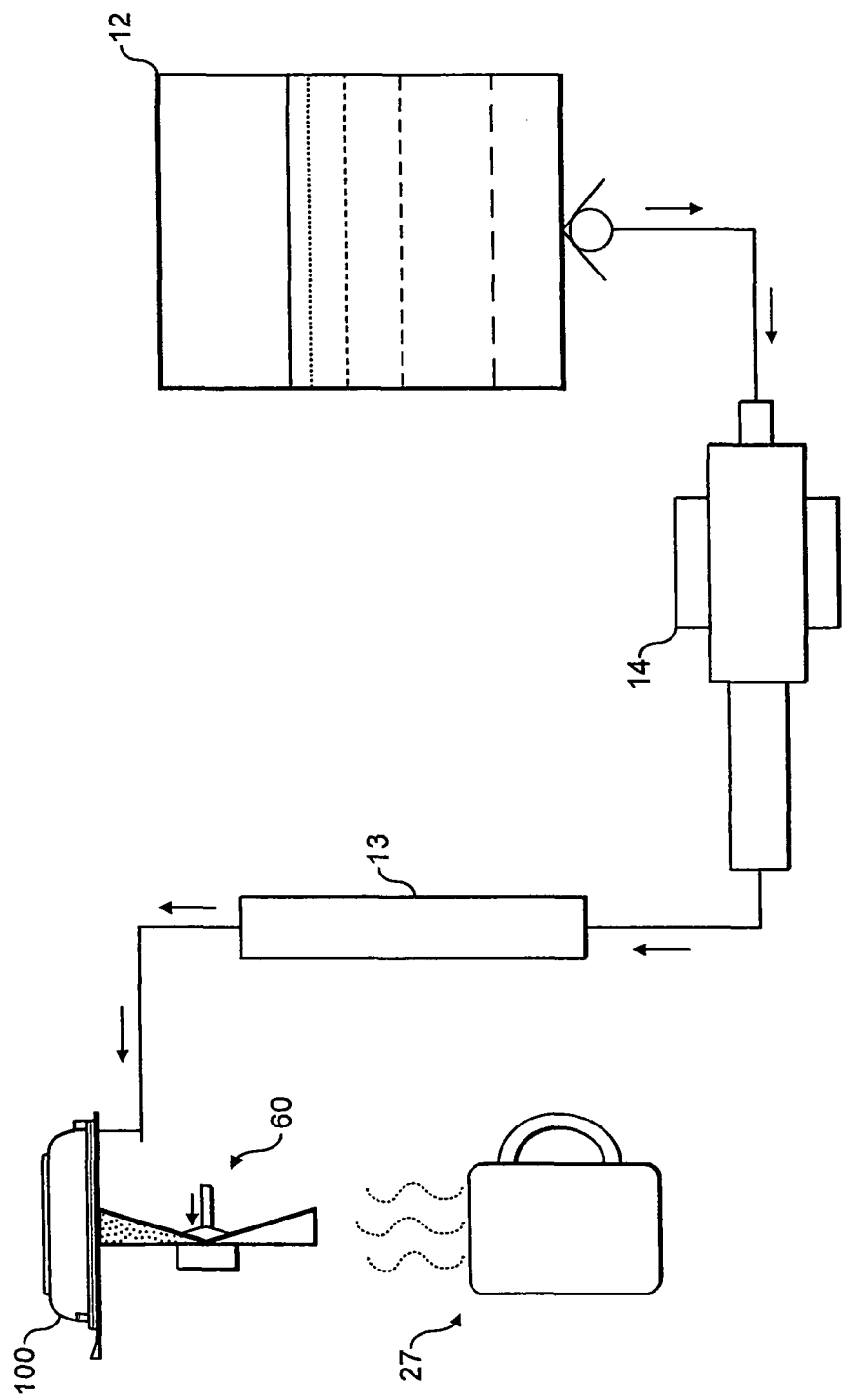
FIG. 8 is a schematic showing the various component parts of the machine of FIG. 1 incorporating a new variable outlet valve.
Figure 9:
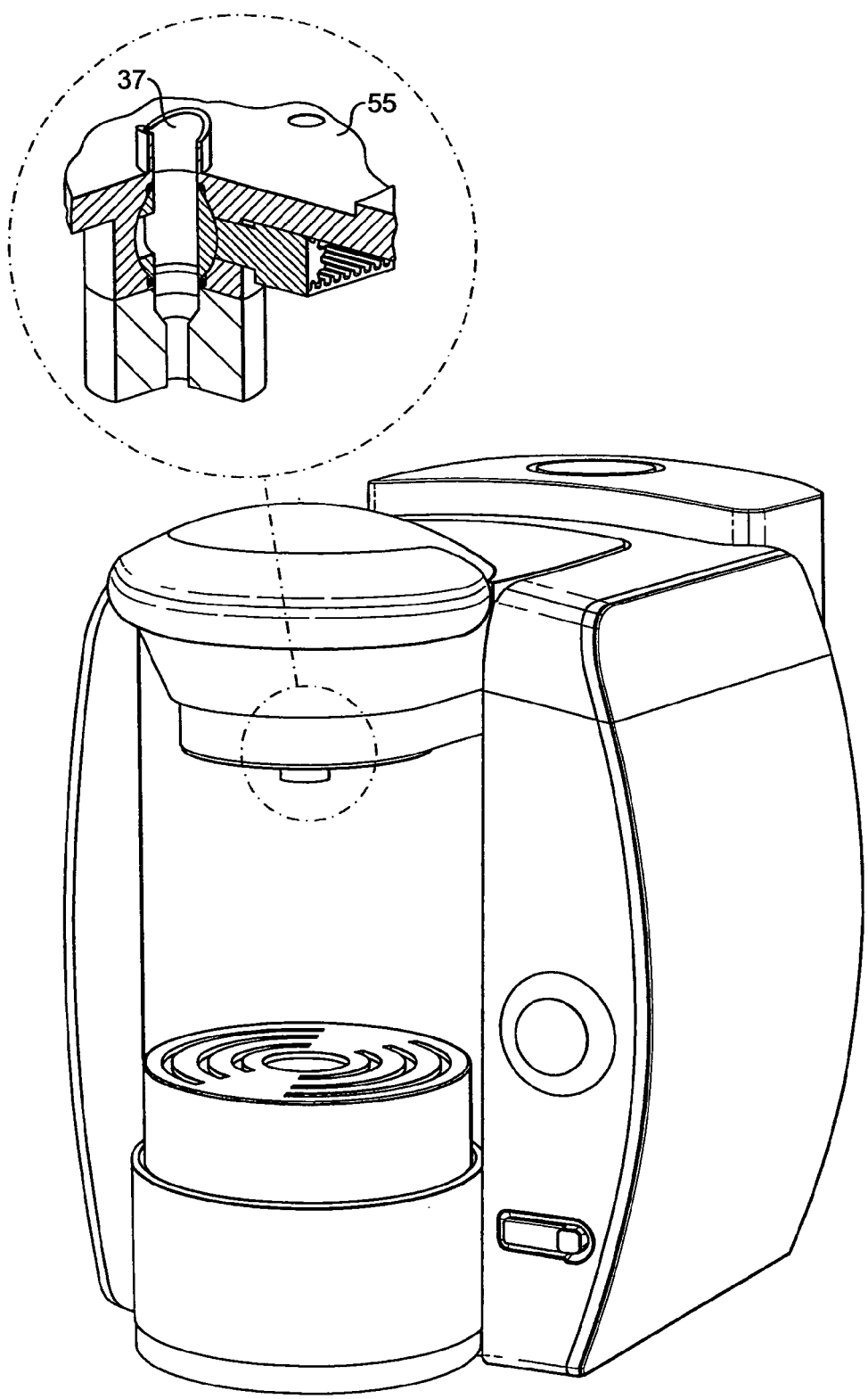
FIG. 9 is a section of schematic of an outflow from the cartridge head incorporating the variable outlet valve of FIG. 8.

The pump 14 is operatively connected between the tank 12 and the water heater 13, as shown schematically in FIG. 8, and is controlled by the control processor. A suitable pump provides a flow rate of 900 ml/min of water at a pressure of 6 bar. The flow rate of water through the machine 10 can be controlled by the control processor to be a percentage of the maximum flow rate of the pump 14 by cycle chopping the electrical supply to the pump. Preferably the pump can be driven at any of 10%, 20%, 30%, 40%, 50%, 60%, 70%, 80%, 90% or 100% of the maximum rated flow rate. The accuracy of the volume of water pumped is preferably + or −5% leading to a + or −5% accuracy in the final volume of the dispensed beverage. A volumetric flow sensor (not shown) is preferably provided in the flow line either upstream or downstream of the pump 14. Preferably, the volumetric flow sensor is a rotary sensor.

The heater 13 is located in the interior of the housing 11. One suitable heater 13 has a power rating of 1550 W and is able to heat water received from the water pump 14 from a starting temperature of approximately 20° C. to a nominal operating temperature of around 85° C. in under 1 minute. Preferably the dwell time between the end of one dispense cycle and the heater 13 being able to commence a subsequent dispense cycle is less than 10 seconds. The heater maintains the selected temperature to within + or −2° C. during the dispense cycle. The water for the dispense cycle is delivered to the cartridge head 17 at a predetermined temperature. The heater 13 is able to quickly adjust the delivery temperature to the required temperature, generally between 80° C. and 98° C., and possibly higher from the incoming water temperature. The heater 13 comprises an over-temperature cut-off which shuts off the heater 13 if the temperature exceeds 98° C. Where desired, the machine 10 can incorporate a steam purge. The preferred means of generating the steam purge is to utilise a water heater 13 in the form of a flash (also known as an instantaneous or flow) heater. Typically such flash heaters comprise a tube through which the water passes wherein the tube is heated by one or more resistive elements. The flash heater can be used not only for heating water for forming beverages but also, at higher power settings, for generating a steam purge by boiling off water remaining with the flash heater tube after the beverage has been formed. An advantage of flash heaters is that there is no significant delay whilst water in a boiler heats up. Flash heaters heat water on demand and switch off immediately after each brewing cycle and are therefore very energy efficient.

Water output from the heater 13 is fed via a suitable delivery system to the cartridge head 17 and cartridge 100 by means of a valve. If the pressure of the water flow is acceptable, the water is passed to the cartridge 100. If the pressure is below or above predetermined limits then the water is diverted by means of the valve to a waste recovery receptacle.

The delivery system comprises conduits which connect the tank 12, the water pump 14, the water heater 13 and the cartridge head 17 (as shown in FIG. 8) to transport the water from the tank 12 to the cartridge 100.

The cartridge holder 18 is designed to be capable of handling the opening forces generated by the pressure inside the cartridges 100, which is around 250 kg for espresso beverages. During operation of the machine 10 the cartridges 100 attempt to expand, but the integrity of the cartridges 100 must be maintained. In addition the user must not be able to open the holder 18 whilst the system is pressurised and suitable locking mechanisms are provided to achieve this.

One suitable design of cartridge head 17, as described in WO-A-2006/014936, is shown in FIGS. 4 to 7. The cartridge holder 18 of the cartridge head 17 comprises a fixed lower part 43, a rotatable upper part 44 and a pivotable cartridge mount 45 positioned between the fixed lower part 43 and the rotatable upper part 44. The upper part 44, lower part 43 and cartridge mount 45 are rotated about a common hinge axis 46. FIGS. 4 to 7 show the holder 18 with some components of the machine 10 omitted for clarity.

The rotatable upper part 44 and pivotable cartridge mount 45 are moved relative to the fixed lower part 43 by means of a clamping mechanism. The clamping mechanism comprises a clamping lever having first and second members or parts 47 and 48. The first part 47 of the clamping lever comprises a U-shaped arm which is pivotably mounted to the upper part 44 at two first pivot points 48, one on each side of the holder 18.

The second part of the clamping lever comprises two over-centre arms 49, one on each side of the holder 18 which are each pivotably mounted to the upper part 44 at a second pivot point 50 located on the hinge axis 46 coupling the upper part 44 to the fixed lower part 43. Each over-centre arm 49 is a reciprocal member comprising a cylinder 49a, a stem 49b and a resilient sleeve 49c. The cylinder 49a has an internal bore and is rotatably mounted at one end at the hinge axis 46. A first end of the stem 49b is slidingly received in the bore of the cylinder 49a. The opposite end of the stem 49b is rotatably mounted to the U-shaped arm 47 at a third pivot point 51. The third pivot points 51 are unconnected to, and freely moveable relative to, the upper part 44 and lower part 43. The resilient sleeve 49c is mounted externally on the stem 49b and extends, in use, between abutment surfaces on the cylinder 49a and stem 49b. The resilient sleeve 49c accommodates shortening of the over-centre arm 49 but biases the over-centre arm 49 into an extended configuration. Movement of the third pivot points 51 towards and away from the hinge axis 46 is thus possible by relative movement of the stems 49b in the cylinders 49a. The resilient sleeves 49c are preferably formed from silicone. Whilst the illustrated embodiment uses two over-centre arms 49, it will be apparent that the closure mechanism may be configured with only one over-centre arm 49.

The U-shaped arm 47 extends around the front of the holder 18 and comprises two downwardly dependant hook members 52, one on each side of the holder 18, each comprising a cam surface facing the hinge axis 46. The fixed lower part 43 of the holder 18 is provided with two bosses 53, or detents, located one on each side of the lower part 43 at or near a front edge 54 thereof aligned generally with the hook members 52.

Figure 4:
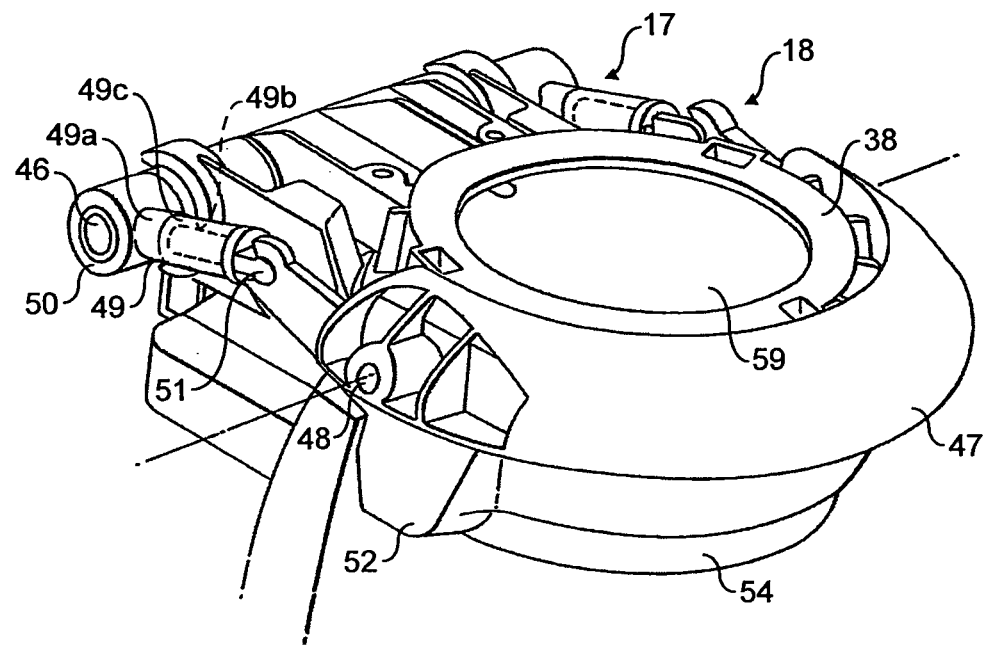
FIG. 4 is a front perspective view of a cartridge head of the machine of FIG. 1 with some parts omitted for clarity.
Figure 5:
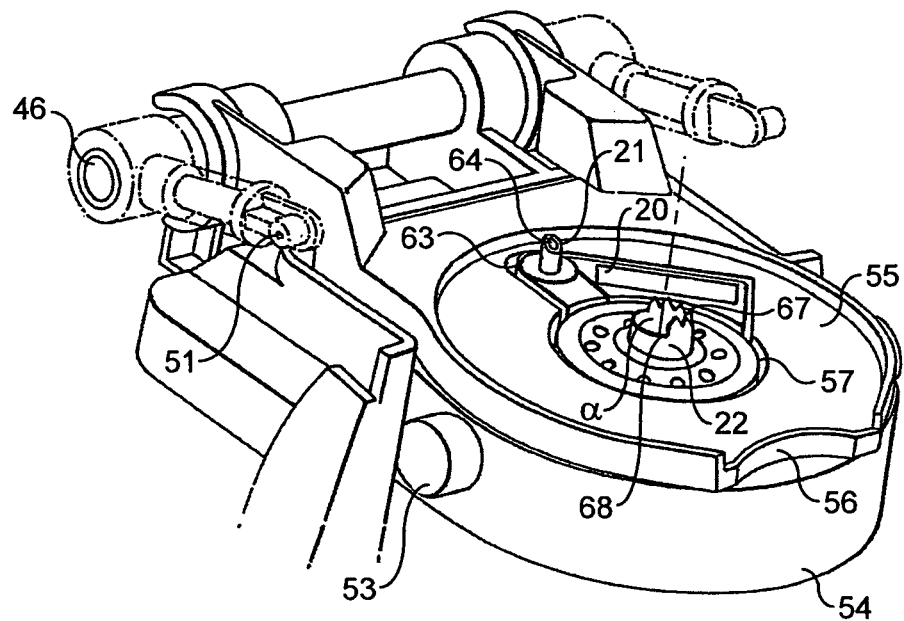
FIG. 5 is another front perspective view of the cartridge head of FIG. 4, with some parts omitted for clarity.

As shown in FIG. 4, the U-shaped arm 47 may be formed from a one piece plastics moulding comprising an ergonomic hand grip and the hook members 52 integral to the arm 47.

Figure 7:
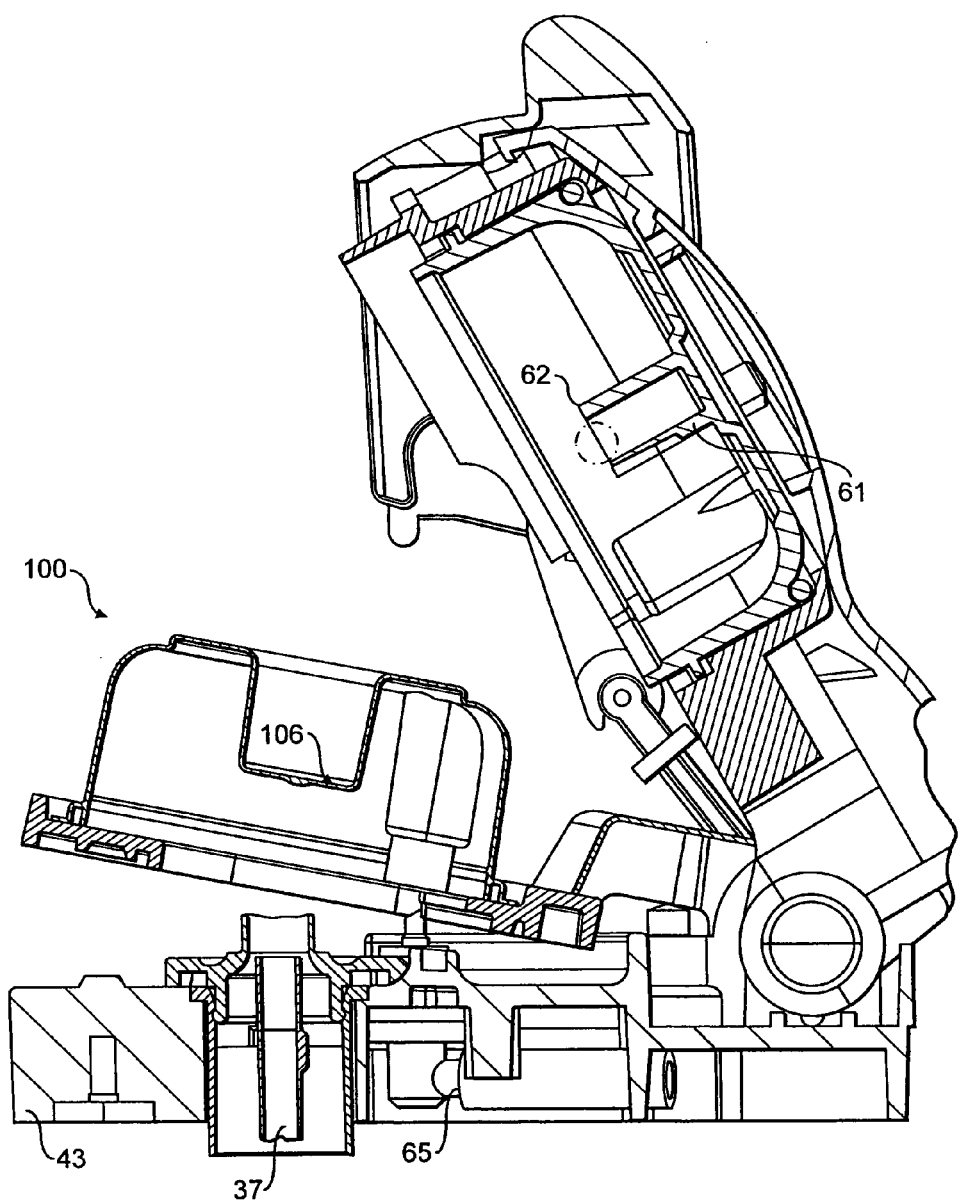
FIG. 7 is a cross-sectional side elevation of the cartridge head of FIG. 4 in an open position accommodating the beverage cartridge.

The cartridge mount 45 is rotatably mounted between the upper and lower parts 43, 44 of the holder 18. The mount 45 is provided with a substantially circular recess 55 which receives in use the beverage cartridge 100 (which is described in greater details below). The recess 55 includes an irregularity 56 for accommodating the handle portion 24 of the beverage cartridge 100 which also acts to prevent rotation of the beverage cartridge 100 in the holder 18. The cartridge mount 45 is sprung relative to the fixed lower part 43 such that in the open position, as shown in FIG. 7, the cartridge mount 45 is biased out of contact with the fixed lower part 43 so that the cartridge mount 45 is moved out of contact with the outlet and inlet piercer members 21, 22. The cartridge mount 45 is provided with an aperture 57 for receiving there through the inlet and outlet piercers 21, 22 and a head of the cartridge recognition means 20 when the cartridge mount 45 is moved into the closed position.

Figure 6:
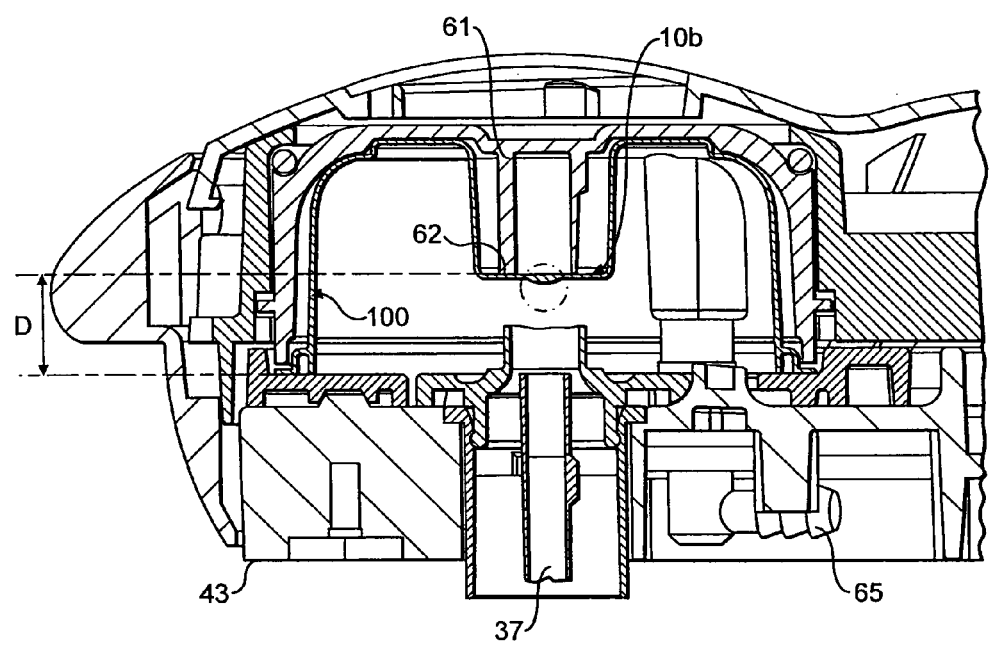
FIG. 6 is a cross-sectional view of the cartridge head of FIG. 4 in a closed position accommodating a version of a beverage cartridge.

The upper part 43 comprises a generally circular body 58 housing a circular viewing window 59 through which a consumer can view the beverage cartridge 100 during a dispense cycle and also visually confirm whether a cartridge 100 is loaded in the machine 10. The viewing window 59 is cup-shaped having a downwardly directed rim. In addition, the viewing window 59 is provided with a clamping member in the form of an inwardly directed tubular extension 61 as shown in FIG. 7. The extension 61 is directed towards the lower part 44 and lies within the volume of the cartridge head when in the closed position as shown in FIG. 6. The viewing window 59 is able to move axially relative to the housing 58 of the upper part 43. One arrangement of accomplishing the relative movement is to provide a wave spring (not shown), or similar resilient means such as a rubberised ring, positioned between the viewing window 59 and the circular housing 58. In an alternative arrangement, a series of helical compression springs (not shown) are provided extending between the viewing window 59 and the housing 58. In both cases the resilient means allows the viewing window 59 to move axially relative to the circular housing 58 by a small degree.

When the holder 18 is in the closed position, a distal end 62 of the tubular extension 61 of viewing window 59 bears against the clamping surface 18a of the beverage cartridge 100 biasing it against the lower part 44 as shown in FIG. 6 (in which the arrangement is illustrated containing a cartridge having a greater depth). The pressure exerted by the tubular extension 61 on the outer member 102 ensures a fluid tight seal between the cartridge 100 and the holder 18. It should be noted that the height of the viewing window 59, and hence also the cartridge head 17, is such that cartridges 100 of various depths can be inserted. In FIG. 6 the arrangement is shown with a relative deep cartridge. The same cartridge head 17 can also accommodate shallower cartridges. In this case there will be a gap between the upper surface 11 of the cartridge 100 and the window 59. However the cartridge 100 is fully sealed at inlet and outlet by the pressure applied by the tubular extension 61.

The lower part 43 comprises the inlet and outlet piercers 21, 22 and the head of the cartridge recognition means 20. The inlet piercer 21 comprises a hollow needle-like tube 63 having a sharpened end 64 for perforating the laminate 108 of the beverage cartridge 100 in use. The inlet piercer 21 is in fluid communication with a water conduit 65, as shown in FIG. 7, which passes through the lower part 43 and is connected to an outlet conduit 66 of the water heater 13. The outlet piercer 22 is similar in type to the outlet piercer described in the EP-A-0389141 and EP-A-0 334572 and comprises an open ended cylinder of circular or D-shaped cross-section having dimensions larger than the beverage discharge spout 109. An arcuate portion 67 of the upper end of the outlet piercer 22 is serrated to pierce and eventually cut the laminate of the beverage cartridge 100. The remainder of the upper end is cut back longitudinally of the cylinder at least to the base of the teeth 68 of the serrated portion to fold or pull the cut laminate 108 away from the outlet aperture before the beverage is dispensed there through. The outlet piercer 22 pierces the laminate 105 externally of the discharge spout 143 and when the cartridge mount 45 is in the closed position, rests in the annulus between the discharge spout 143 and the outer wall 42 of the discharge funnel 140. The outlet piercer 22 folds back the cut laminate 105 into the annulus. Thereby both the outlet piercer 22 and the cut laminate 105 are held out of the way of the discharged beverage.

The outlet piercer 22 is surrounded by a ledge which is raised relative to its surroundings by 0.5 mm.

Advantageously, the outlet piercer 22 is removable from the lower part 43 to enable it to be thoroughly cleaned, for example, in a dishwasher. The removable outlet piercer 22 is received in a recess in the lower part 43 where it is seated. The inlet piercer 21 and/or the outlet piercer 22 may be made of a metal, such as stainless steel, or from a plastics material. Advantageously, the use of plastic cutting elements is enabled by use of a laminate 105 which is able to be punctured and cut by a non-metallic material. Consequently, the piercers 21, 22 can be made less sharp which lowers the risk of injury to the consumer. In addition, plastic piercing elements are not prone to rust. Preferably, the inlet piercer 21 and the outlet piercer 24 are formed as a single, integral unit which is removable from the lower part 43.

In use, the upper part 44 of the holder 18 is movable from an open position in which it is orientated vertically or towards the vertical as shown in FIG. 2, to a closed position in which it is orientated substantially horizontally and in interengagement with the fixed lower part 43 and cartridge mount 45. The upper part 44 is moved from the open to the closed positions by operation of the clamping lever. To close the upper part 44 a user takes hold of the clamping lever by the U-shaped arm 47 and pulls downwards. Consequently, the upper part 44 rotates which first brings the tubular extension 61 of the viewing window 59 into contact with the clamping surface 118a of the beverage cartridge 100. Continued rotation of the upper part 44 rotates the upper part 44 and cartridge mount 45 down into contact with the lower part 43. Further rotation of the U-shaped arm 47 causes the U-shaped arm 47 to rotate relative to the upper part 44 and the lower part 43 resulting in the hook members 52 of the upper part 44 engaging the bosses 53 of the lower part 43 with the cam surface riding over the bosses 53. During this last stage of rotation the cartridge 100 is compressed between the cartridge mount 45 and the viewing window 59. As a result, the viewing window 59 is moved axially slightly relative to the circular housing 58 of the upper part 44 against the bias of the wave spring or helical springs. This movement allows for a take up of tolerances in the beverage cartridge 100 and beverage preparation machine 10 and ensures that the amount of compressive force applied to the cartridge 100 is kept within an acceptable range. The clamping force of the mechanism as moderated by the action of the wave spring or helical springs ensures a clamping pressure on the cartridge 100. It has been found that a force of between 150N and 400N is required to counter the pressure in the cartridge 100. During closure of the cartridge head the laminate 105 of the cartridge 100 is tensioned as it is brought into contact with the ledge surrounding the outlet piercer 22 which causes the laminate 105 to flex out of plane as the distal end of the outer tube 42 of the cylindrical funnel is moved upwardly by 0.5 mm relative to the flange 147. This movement also ensures that the great majority of the compressive force applied to the cartridge 100 acts through the central region of the cartridge 100 through the load-bearing inner member 103. These clamping forces help prevent failure of the cartridge 100 during pressurisation and also ensure that the inner member 103 and outer member 102 are fully seated relative to one another and thus that all internal passageways and apertures remain at their intended dimensions even during internal pressurisation.

In the closed position, the separation of the distal end 62 of the tubular extension 61 and the lower part 44 is shown by reference D in FIG. 6. This distance is fixed by the dimensions of the viewing window 59, housing 58 and lower part 44. The distance D is chosen to be the same or marginally smaller than the distance d between the clamping surface 118a and laminate 105 under surface of the cartridges 100. In this way, on closure of the cartridge head 17 the cartridges 100 are subjected to a fixed, known degree of compression. In addition, both the first and second embodiments of cartridge can be clamped with the same degree of compression since distance D is the same for both cartridge types.

An imaginary datum line can be drawn between the first and second pivot points 48, 50 of the holder 18. As can be seen in FIG. 7, in the open position the third pivot points 51 are located on the side of the datum line nearest the fixed lower part 43. As the upper part 44 reaches the closed position, the third pivot points 51 of the clamping lever pass through the datum line joining the first and second pivot points 48, 50 to the opposite side of the line, furthest from the fixed lower part 43. Consequently, the U-shaped arm 47 'snaps through' from a first stable position to a second stable position. The snap through action is accommodated by shortening of the over-centre arms 49 and consequential compression of the resilient sleeves 49c. Once the third pivot points 51 are past the imaginary datum line, the recovery of the resilient sleeves 49c acts to continue the motion of the third pivot points 51 away from the imaginary datum line. The clamping lever thus has a bi-stable operation in that the lever is stable in the open or closed positions but unstable at the point when the third pivot points 51 lie on the imaginary datum line joining the first and second pivot points 48, 50. Thus, the snap-through action of the clamping lever provides a positive closure mechanism which leads to a definite closure action wherein in the final stages of the clamping lever's rotation, the snap-through action of the U-shaped arm 47 and second arms forces the hook members 52 firmly into engagement with the bosses 53. In addition, the resilient sleeves 49c provide a resistance to re-opening of the upper part 44 since a minimum force is required to compress the sleeves 49c sufficiently to move the third pivot points 51 back into line with the datum line joining the first and second pivot points 48, 50. Advantageously, the interengagement of the hook members 52 and the bosses 53 prevents separation of the upper and lower parts other than by rotation of the clamping lever. This is useful in preventing opening of the cartridge head 17 during operation when the cartridge head 17 is subject to internal pressurisation.

Figure 7A:
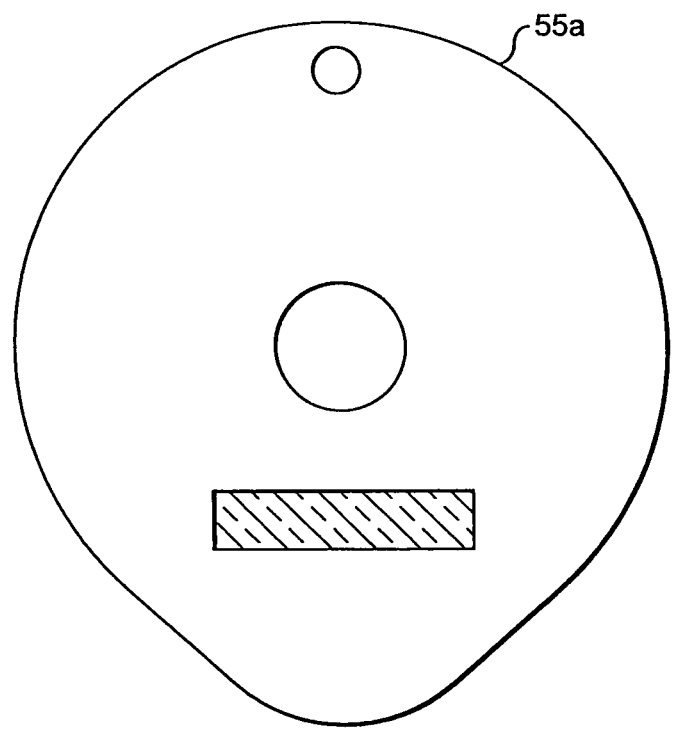
FIG. 7A is a plan view of a rubber seal for the cartridge head of FIG. 4.

The pressure exerted by the upper section 44 ensures a full fluid tight seal between the cartridge 100 and the cartridge holder 18. The clamping forces help prevent failure of the cartridge 100 during pressurisation and also ensure that all of the internal passageways and apertures within the cartridge 100 remain at their intended dimensions even during internal pressurisation. To improve the seal with the cartridges 100 the applicant has now found that lining the recess 55 of the cartridge mount 45 with a rubber seal 55a (see FIG. 7a) improves the machine's ability to withstand the significantly higher pressures generated during the brewing cycle.

Control of the brew cycle is effected by the control processor of the beverage preparation machine 10, which comprises a processing module and a memory. The control processor is operatively connected to, and controls operation of, the heater 13, pump 14, user interface 16, and other components described below.

The operational behaviour of the machine 10 is determined by software embedded in the control processor, for example as described in EP-A-1440644. The memory of the control processor includes one or more variables for one or more operational parameters for the beverage preparation machine 10. In the prior art machines these are generally the temperature of the liquid passed through the beverage cartridge 100 during the operating stage, the speed of charging the beverage cartridge 100, the presence or otherwise of a soak step, the total dispensed volume of the beverage, the flow rate of the liquid during the discharge stage, and the period of the purge stage.

One purpose of the cartridge recognition means 20 is, inter alia, to allow the machine 10 to recognise the type of beverage cartridge 100 that has been inserted and to adjust one or more operational parameters accordingly. The variables for the operational parameters are stored in the memory. The cartridge 100 comprises a code 120 provided on or in the cartridge 100 representing the operational parameters required for optimal dispensation of the beverage in that cartridge 100. An example of the code is described in EP-A-1440644.

The control processor memory further stores information on the type of beverage dispensed so that the operating cycle of the machine 10 may be adjusted for the next cartridge 100. This is especially advantageous where two or more beverage cartridges 100 are used sequentially to form a beverage. For example a coffee cartridge may be dispensed followed by a milk cartridge to form a cappuccino beverage. Alternatively a chocolate cartridge could be used followed by a milk cartridge to produce a creamy hot chocolate beverage. By using a memory that stores information on the first beverage dispensed, the manner of dispensing the second cartridge, say a milk cartridge, may be altered to achieve an optimum beverage. In the above example the milk dispensed for hot chocolate may, typically, be diluted less than the milk added to the coffee. In addition, the milk dispensed for chocolate may be dispensed at a slower flow rate to lessen the degree of foaming of the beverage. Many combinations of cartridges are possible and operating parameters as will be obvious to the skilled person. In addition, the memory may be used to allow the machine 10 to 'predict' the type of beverage that a user will next want to dispense. For example, if a user predominantly drinks one beverage type then the machine can instruct the water heater to remain at the optimum temperature for that beverage type.

Operation of the known prior art machines 10 comprises insertion of a beverage cartridge 100 into the cartridge head 17, carrying out a dispense cycle in which the beverage is dispensed and removal of the cartridge 100 from the machine.

To insert the cartridge 100 the cartridge holder 18 is opened as described above to expose the cartridge mount 45. The cartridge 100 is then placed on the cartridge mount 45 received within the recess 46. The cartridge holder 18 is then closed by operation of the clamping handle 51 as described above. During closure the inlet and outlet piercers pierce the cartridge 100 to form the cartridge inlet 107 and outlet 108.

To commence the operating cycle the user operates the start/stop button 28. The operating cycle comprises the steps of cartridge recognition and the beverage preparation cycle.

Cartridge recognition is performed by the optical cartridge recognition means 20 as described above assuming that the outputs from the cartridge sensor and lock sensor are satisfactory. Once the barcode 40 has been decoded the operational parameters of the machine 10 are adjusted by the control processor. The preparation cycle is then automatically commenced. The preparation cycle has four main stages, although not all of these are used for all beverage types:

1. Pre-wet
2. Pause
3. Brew stage
4. Purge

In the pre-wet stage the cartridge 100 is charged with liquid from the storage tank 12 by means of the pump 14. The charging with water causes the beverage ingredients 200 in the chamber 160 to be wetted. The charging may take place at a "fast" flow rate of 600 ml/min or a "slow" flow rate of 325 ml/min. The slow charging rate is particularly useful for cartridges 100 containing viscous liquid beverage ingredients where the ingredients require some dilution before they are able to be pumped at a higher volume flow rate. The volume of liquid injected into the cartridge 100 is selected to ensure that liquid or beverage does not drip out of the cartridge outlet 108 during this stage.

The pause stage allows the beverage ingredients 200 to soak in the liquid injected during the pre-wet stage for a predetermined period of time. Both the pre-wetting and soaking stages are known to increase the yield of the extractibles from the beverage ingredients 200 and to improve the end flavour of the beverage. Pre-wetting and soaking are particularly used where the beverage ingredients are roast and ground coffee.

In the brew stage liquid is passed through the cartridge 100 in order to produce the beverage from the beverage ingredients 200. The temperature of the liquid is determined by the control processor which sends instructions to the heater 13 to heat the liquid passing from the tank 12 to the cartridge head 17. Liquid enters the cartridge holder 18 via an inlet valve and the inlet piercer and then passes into the inlet chamber 126 of the beverage cartridge 100. Brewing and/or mixing of the beverage in the beverage cartridge 100 occurs, as described in EP-A-1440644, before the prepared beverage exits the cartridge outlet 104, enters the outlet valve 37 and is directed into a suitably placed receptacle in the dispensing station 27.

During the purge cycle the temperature of the water heater 13 is raised sufficiently high to convert the water remaining in the system to steam and blowing the pressurised steam through the beverage preparation machine 10 and the beverage cartridge 100. This ensures that all beverage is dispensed and that the flow path is cleared ready for dispensing another beverage. The purge cycle may not commence immediately on cessation of the brew/mixing stage to allow for the majority of the fluid to clear the flow path.

Once the operating cycle has been completed, the machine automatically stops and the consumer removes the cartridge 100 by opening the cartridge holder 18 and manually removing and disposing of the cartridge 100. Alternatively, the machine 10 may be provided with an automatic ejection mechanism for removing the cartridge automatically on opening the cartridge holder 18.

The first of the significant improvements to the known beverage preparation machines 10 referred to above is the provision of variable geometry valve 60 (see FIGS. 9 to 15) provided adjacent the cartridge outlet 108 to provide post-cartridge pressure control. This enables the machine 10 to produce a wide variety of beverages, as it allows the cartridges 100 to be selectively brewed at either high or low pressure or a varying pressure during the brew cycle, depending on the type of brew cycle required for the beverage ingredients in the cartridge as identified by the cartridge recognition means 20, thus providing an automated variable pressure system. The modified machine is capable of producing beverages at a range of pressures, for example from 0 to 9 bar, and more preferably from 0 to 6 bar.

The variable geometry valve 60 is positioned downstream of the cartridge 100, and preferably positioned in the beverage outlet 37, which is partially housed in, and extends from, the lower section 43 of the cartridge head 17 (see FIGS. 6 and 7).

The valve 60 has at least an open and a restricted operating position (i.e. state or mode), and more preferably all of the positions identified below:

1. Open (FIG. 11)
2. Restricted (FIG. 12)
3. Closed (FIG. 10)
4. Cleaning/purging.

Figure 10:
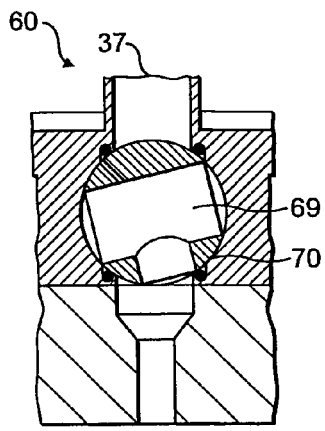
FIGS. 10-12 are cross-sectional front elevations of one embodiment of the variable valve in the outflow of FIG. 9 showing it's closed, open and restricted positions respectively.
Figure 11:
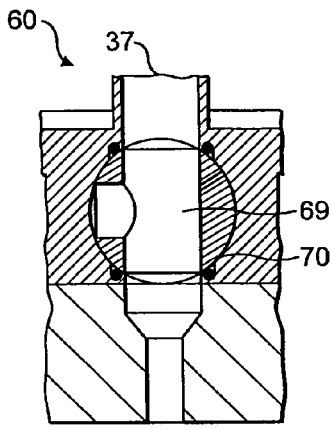
Figure 12:
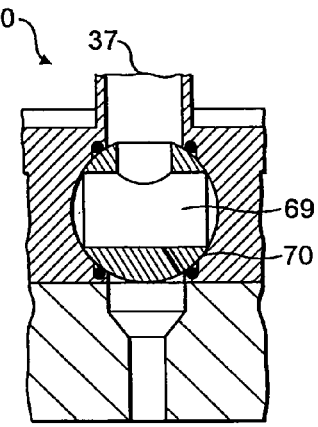

Various types of valve may be used for the outlet valve 60, such as ball valves, pinch valves, sleeve valves, seat valves or disc valves. The embodiment illustrated in FIGS. 10 to 12 is a ball type valve which has a rotating element 69 located in a chamber 70 in the beverage outlet 37. The rotating element 69 is rotatable between preset positions to provide the required position. The diameter of the bore of the valve 60 in the unrestricted position is preferably at least 5 mm which is required, for example, for cartridges 100 providing low pressure filter beverages.

Figure 13A:
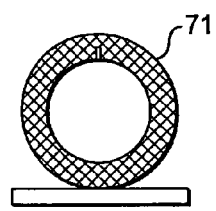
FIGS. 13a and 13b are cross-sectional end elevations of an alternative variable outlet valve used in the outflow of FIG. 9 in its open and closed position respectively.
Figure 13B:
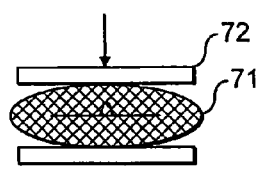

An alternative suitable valve is a pinch valve illustrated in FIGS. 13 to 15 which comprises a flexible tube 71, preferably made of silicon rubber or an elastomeric material, and a clamping mechanism 72. In the unrestricted position (FIGS. 13a and 14) the beverage flows freely through the tube 71. The clamping mechanism 72 is activated to provide a restricted position (FIGS. 13b and 15) and closed position.

The valve 60 is controlled automatically by the control processor of the machine 10. Once the type of cartridge 100 inserted into the machine 10 has been identified, by the decoding the barcode 40, the control processor selects the correct initial setting and, if appropriate, any subsequent operation of the valve 60 for the relevant beverage type.

The machine 10 can operate in a range of modes, with the valve 60 in one or more operating positions, some examples of which are:

1. Valve Open Throughout the Brewing Cycle

When the valve 60 is in its open position the operating pressure is below 2 bar allowing a steady state through flow rate of up to 400 ml/min. The beverage is dispensed under similar conditions to those described in EP-A-1440644. This mode is particularly useful as it renders the machine 10 backwardly compatible with existing cartridges for preparing low pressure beverages, such as tea, foamed milk or chocolate.

2. Valve Restricted Throughout the Brewing Cycle

When the valve 60 is in its restricted position it creates a relatively high back pressure within the cartridge 100, which results in an operating pressure of up to 4, 6 or even 9 bar and provides a steady state through flow rate of 60 to 300 ml/min. This is sufficient to obtain the necessary solids extraction and emulsification of oils in the beverage ingredients 200 for an espresso beverage. The consequential restriction in the beverage outlet 37 provides a shearing and mixing action in the beverage flowing through the valve 60, giving rise to good air/liquid emulsification and resulting in an improved crema. This mode can advantageously be used for preparing higher pressure beverages, such as espressos and cappuccinos, from cartridges 100 which do not have means for entraining air to effect the mixing action, i.e. so called non-eductor cartridges.

3. Valve Closed then Restricted

If the valve 60 is closed immediately at the start of the brewing cycle (before the pump 14 commences and during the pre-wet cycle), this enables a higher pressure to be developed within the cartridge 100 than when the valve 60 is in its restricted position.

Further combinations may be appropriate, such as valve closed then open or valve closed then restricted then open according to the desired effect to be achieved.

If required, the valve 60 can be pulsed between various positions during the brewing cycle, or a part thereof. This manner of valve operation during the delivery cycle enables beverages with a crema having a graduated colour and/or bubble size to be produced.

During the purge cycle the valve 60 is controlled by the control processor to divert the steam to a drain area rather than to the dispensing station 27 to preserve the appearance of the beverage and prevent contamination.

The second of the significant improvements to the known beverage preparation machines 10 referred to above is the addition to the brew control system of gas management. Surprisingly the applicant has now discovered that the characteristics of beverages prepared in this type of beverage preparation machine can be modified beyond boundaries hereto seen in prior art machines. The surprising effect is enacted by controlling the volume of gas in the delivery system during the preparation of the beverage to prescribe the amount of high quality crema on a beverage, varying from a delicate layer up to a surprisingly deep layer in the final beverage. The applicant has found a way to successfully use gases within the beverage machine to modify the gas:liquid ratio to produce a surprising volume of good stable crema in prepared beverages never seen before in prior art machines. Maintaining a greater volume of gas in the delivery system enables a much larger gas:liquid ratio to be achieved during brewing and dispensing and this produces a correspondingly larger volume of crema. Decreasing the volume of gas enables the ratio to be decreased to reduce the crema volume. The bubble size is also influenced by the gas:liquid ratio, so a lower ratio can be used to provide a tight and creamy crema and a higher ratio used to provide a more loose and bubbly crema. This improvement therefore provides the ability to optimise the crema volume and bubble size for each beverage dispensed. It has been found that by manipulating the gas, good quality espressos can be brewed with a crema volume greater than 25% of the beverage volume whilst minimising the occurrence of bubbles having a diameter of more than 172 microns, which has not previously been seen to be possible in known beverage preparation machines of this type. In the prior art cartridge machines it has generally not been possible to brew espressos with a crema greater than 10% of the beverage volume.

The improvement is achieved by adapting the control of the brew cycle to provide means for managing the volume of gas within the delivery system which conveys the water from the tank 12 to the beverage ingredients 200 and to the dispensing outlet. All further references in this specification to the delivery system are intended to include any predetermined section thereof, for example the section extending from the water heater 13 to the cartridge 100 and may also include, if relevant, some gas contained within a headspace of the cartridge 100.

The "basic volume" of gas which can reside within the delivery system of any given machine 10 is dependant on its construction. The "actual volume" at any given time will vary according to whether the machine 10 has just been used to prepare a beverage, what type of beverage it was used for and whether a steam purge cycle has been run. Thus the improved brew cycle control incorporates means for varying the volume of gas in the delivery system according to the type of beverage to be dispensed (i.e. one requiring a crema with smaller and fewer bubbles or one which requires a greater froth of larger bubbles) taking into account the actual volume of gas already present. The means for varying the volume of gas may be achieved by combinations of:

1. purging the delivery system after a brewing cycle is complete, and prior to a subsequent high pressure brew, which will increase the gas:liquid ratio;

2. venting gas from the delivery system prior to high pressure brewing, which will decrease the gas:liquid ratio; and
3. inducting gas into the delivery system prior to high pressure brewing, which will increase the gas:liquid ratio.

Valve means are preferably provided to enable the volume of gas within the delivery system to be reduced and an air pump to enable gas (typically air) to be injected into the system. A separate, dedicated air valve may be incorporated in the delivery system, either upstream or downstream of the cartridge 100. Preferably the variable geometry valve 60 described above may be used as the valve means.

To enable this improved brew cycle control to be effected, additional parameters to those described in connection with the basic machine 10 may be stored in the memory of the control processor. These additional parameters include the basic volume of gas for the specific construction of machine 10 (which will apply to the machine 10 which is unused or after it has been purged) and the volume required during high pressure brewing for optimising the crema for each specific beverage. Preferably the additional parameters also include the actual volume of gas which will remain in the delivery system after each type of brew operation which the machine 10 is capable of. However this is not wholly necessary if the machine 10 is programmed to run a steam purge cycle after every beverage is dispensed, which effectively resets the actual volume to the basic volume, because it flushes the dispensing system downstream of the water heater 13 of any remaining liquid.

The brew cycle will therefore include an additional step, namely a gas adjustment cycle before the pre-wet cycle. The gas adjustment cycle thus includes:

1. An assessment of the required volume of gas for the type of beverage to be prepared. This will most conveniently be the selection from the processor memory of the required parameter associated with the cartridge code 120;
2. The determination of the actual volume of gas currently resident in the delivery means according to the last operation of the machine 10. This will be the basic volume for an unused machine or if a purge cycle has been run. If the machine has just been used to prepare a beverage and no purge cycle run, the processor ideally selects from the memory the parameter for the remaining gas according to the last beverage. Alternatively, means may also be provided to specifically monitor the volume of gas within the delivery system at any point in time;
3. A calculation of the volume of gas to be inducted into or vented from the delivery system to achieve the required volume;
4. The modification of the volume of gas, if required, by the induction of additional gas (typically air) or the venting of excess gas.

In one example the beverage preparation machine 10 has a basic volume of gas of 36 ml in the section of the delivery means extending between the water heater 13 and the beverage ingredients 200.

There are a number of different modes of operation for step 4 depending on the outcome of step 3, depending on what type of valve means are used. If the valve means are downstream of the cartridge, i.e. an outlet valve, one way of controlling the volume of air upstream of the beverage ingredients 200 prior to high pressure brewing is by closing the outlet valve at different points in the brew cycle as follows:—

1. The Correct Volume of Gas is Present

If the processor calculates that it requires the full basic volume of gas (36 ml) for the beverage to be dispensed, as determined from the reading of the code 120, it closes the outlet valve at the start of the brew cycle, before any water flows from the water heater 13. This means that the compression of the gas in the delivery system will commence immediately the cartridge 100 will be subject to higher pressures during the pre-wet and soak cycles, with the valve only opening to dispense the resultant beverage. As the valve is closed before the pump 14 is started, all of the 36 ml of trapped gas is mixed in to the resulting beverage and a larger volume of slightly coarser crema is obtained (FIG. 16a). In the example shown the volume of crema Y in a graduated, flat bottomed beaker was 20 ml compared to the volume of liquid X, which was 50 ml.

The chart shown in FIG. 16b represents an example of brew cycle parameters used to produce a beverage in this mode with a large volume of crema under test conditions.

In this chart, a stop condition of 0 seconds (e.g. against the remove gas step) indicates that the step is not carried out.

2. Too Much Gas is Present

Figure 17A:
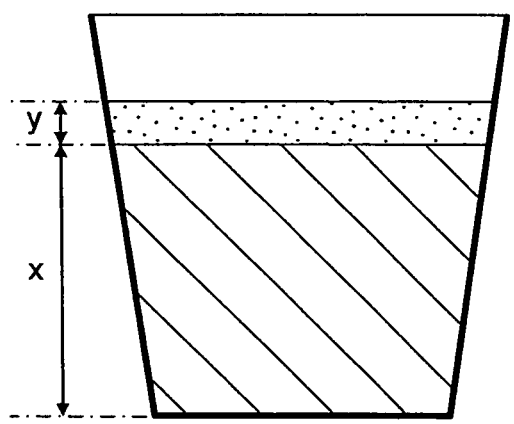
FIG. 17a is a side elevation of a beverage receptacle containing a coffee beverage having a small volume of crema produced using the improved gas management system.
Figure 18:
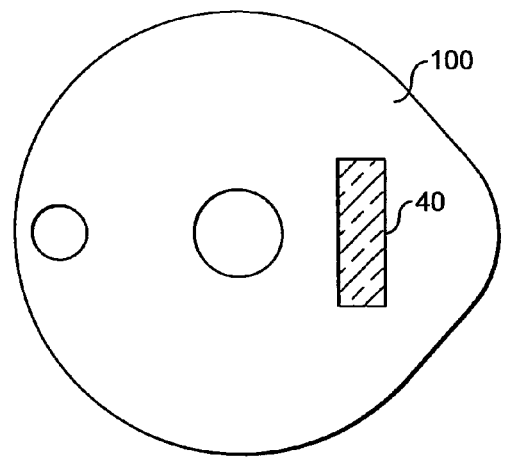
FIG. 18 is a plan view of a beverage cartridge suitable for use in the beverage preparation machine of FIG. 1.

If, on the other hand, a beverage with a small volume of crema is indicated by the cartridge 100 inserted and there is an excess of gas present in the system, the outlet valve is closed after the pump 14 has operated for a short time until the excess gas in the delivery system has escaped through the open valve at low pressure. With the valve being closed later in the brew cycle, the required volume of gas is vented to atmosphere via the cartridge 100 and valve, so a smaller quantity of trapped gas is left to be compressed and mixed in to the resulting beverage during high pressure brewing and consequently a smaller volume of finer crema is obtained (FIG. 17a). In the example shown the volume of crema Y in a graduated, flat bottomed beaker was 5 ml compared to the volume of liquid X, which was 50 ml.

The chart shown in FIG. 17b represents an example of brew parameters used to produce a beverage in this mode with a small volume of crema under test conditions.

3. Insufficient Gas Present

If step 3 indicates that more gas needs to be inducted, the outlet valve is closed immediately and the air pump operated until the deficit has been made up. Thereafter high pressure brewing commences.

Figure 31:
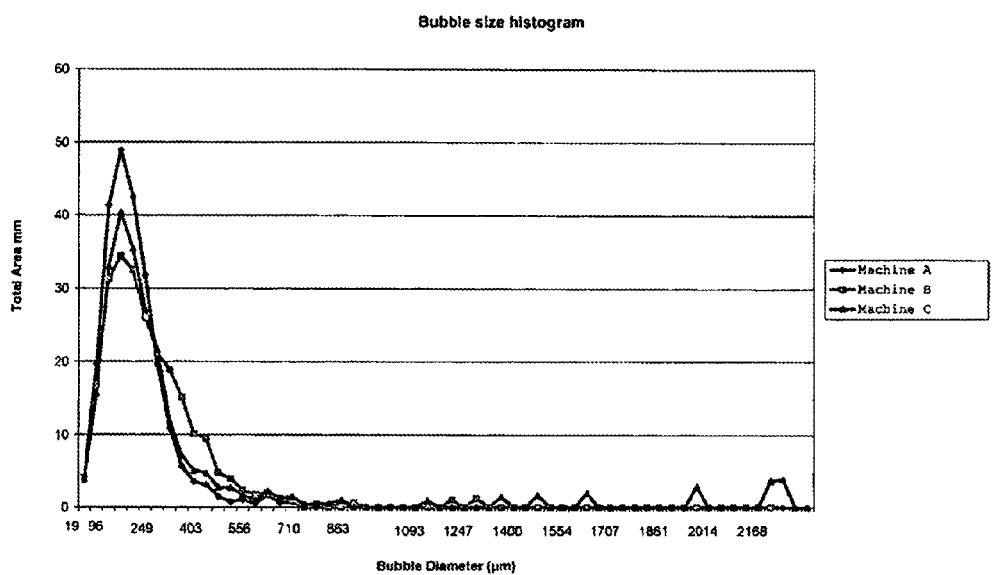
FIG. 31 is a digital image analysis showing a comparison the crema characteristics produced by a beverage preparation machine utilizing the gas management system (machine A) and two prior art machines without the gas management system (machines B and C).

The graph of FIG. 31 is a digital image analysis showing a comparison of the crema characteristics produced by the present beverage preparation machine 10 (machine A) utilising the gas management system and two prior art machines (machines B and C) without such gas management system. Comparing the profiles for each machine from the peak (~172 µm diameter) rightwards (increasing bubble size), it can be seen that machine A exhibits a very tight distribution of small bubbles within the crema. Machine C (the Nespresso Latissma™ which is a high pressure machine which has a pressure rating of around 19 bar and operates at a pressure between 9 and 15 bar) produces a broader/coarser distribution with a number of larger diameter bubbles, whilst machine B (the applicant's own Tassimo/Bosch Machine™ which is a low pressure machine operating at pressures below 2 bar) similar to that described in EP-A-1440644) is coarser still, though without the larger bubbles seen for machine C.

The tail to the left of the chart (extremely small bubbles) is characteristic of the limits of the image analysis systems used to produce the graph, though is qualitatively similar.

Some elements of the control of the gas in the beverage machine 10 may also be effected manually by the use of suitable buttons for the user to press, to indicate the type of beverage being produced and the required crema characteristic.

Whilst this improvement has been described with reference to beverage machines 10 which use cartridges 100, it may also be used in bulk brewers and other non-cartridge machines.

Embodiments of cartridges 100 which are suitable for use in the machine 10 having the improvements described above are shown in FIGS. 18 to 30.

The cartridge 100 generally comprises an outer member 102, an inner member 103 and a laminate 105. The outer member 102, inner member 103 and laminate 105 are assembled to form the cartridge 100 which has an interior 106 for containing one or more beverage ingredients, an inlet 107, an outlet 108 and a beverage flow path linking the inlet 107 to the outlet 108 and which passes through the interior 106. The inlet 107 and outlet 108 are initially sealed by the laminate 105 and are opened in use by piercing or cutting of the laminate 105. The beverage flow path is defined by spatial inter-relationships between the outer member 102, inner member 103 and laminate 105 as discussed below. Other components may optionally be included in the cartridge 100, such as a filter 104, as will be described further below.

A first version of cartridge 100 which will be described is shown in FIGS. 19 to 29. The first version of the cartridge 100 is particularly designed for use in dispensing espresso-style products such as roast and ground coffee where it is desirable to produce a crema. However, this version of the cartridge 100 may be used with other products such as chocolate, coffee, tea, sweeteners, cordials, flavourings, alcoholic beverages, flavoured milk, fruit juices, squashes, sauces and desserts.

Figure 19:
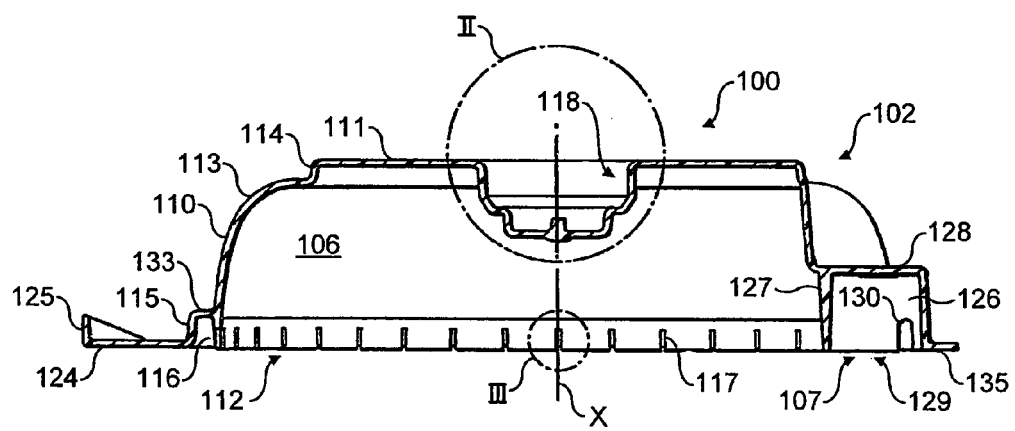
FIG. 19 is cross-sectional side elevation of an outer member of the cartridge of FIG. 18.
Figure 20:
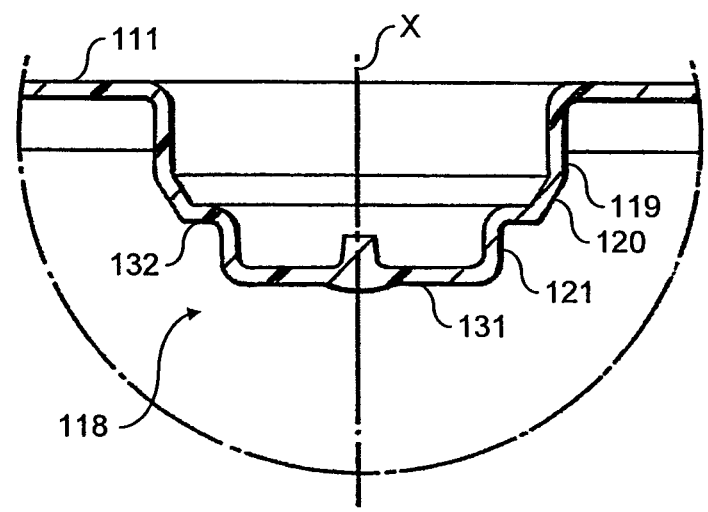
FIG. 20 is a cross-sectional side elevation of a detail of the outer member of FIG. 19 showing an inwardly directed cylindrical extension.
Figure 23:
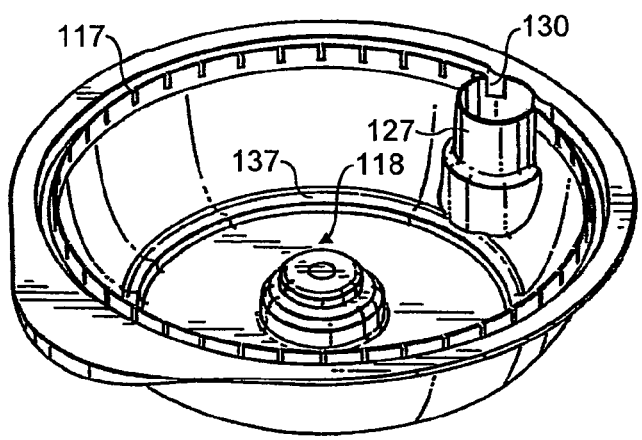
FIG. 23 is a perspective view from above of the outer member of FIG. 19 in an inverted orientation.
Figure 24:
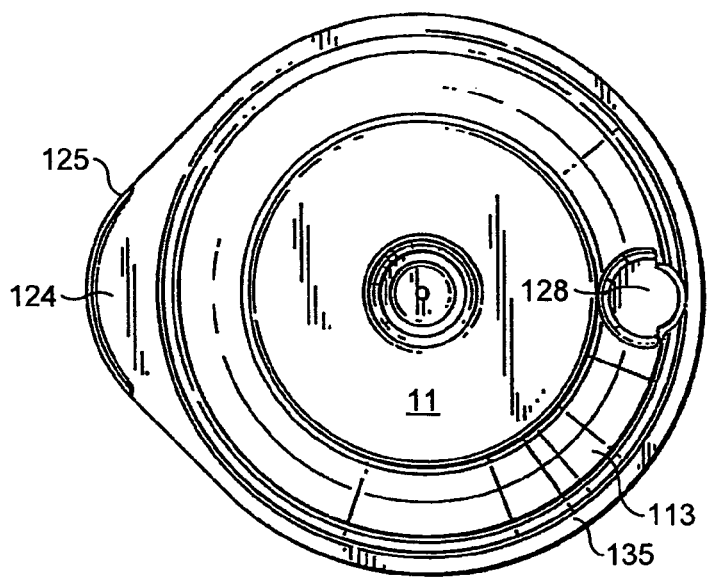
FIG. 24 is a plan view from above of the outer member of FIG. 19.

As can be seen from FIG. 23, the overall shape of the cartridge 100 is generally circular or disc-shaped with the diameter of the cartridge 100 being significantly greater than its height. A major axis X passes through the centre of the outer member as shown in FIG. 19. Typically the overall diameter of the outer member 102 is 74.5 mm±6 mm and the overall height is 16 mm±3 mm. Typically the volume of the cartridge 100 when assembled is 30.2 ml±20%.

The outer member 102 generally comprises a bowl-shaped shell 110 having a curved annular wall 113, a closed top 111 and an open bottom 112. The diameter of the outer member 102 is smaller at the top 111 compared to the diameter at the bottom 112, resulting from a flaring of the annular wall 113 as one traverses from the closed top 111 to the open bottom 112. The annular wall 113 and closed bottom 112 together define a receptacle having an interior 134.

A hollow inwardly directed cylindrical extension 118 is provided in the closed top 111 centred on the major axis X. As more clearly shown in FIG. 20, the cylindrical extension 18 comprises a stepped profile having first, second and third portions 119, 120 and 121. The first portion 119 is right circular cylindrical. The second portion 120 is frusto-conical in shape and is inwardly tapered. The third portion 121 is another right circular cylinder and is closed off by a lower face 131. The diameter of the first, second and third portion 119, 120 and 121 incrementally decreases such that the diameter of the cylindrical extension 118 decreases as one traverses from the top 111 to the closed lower face 131 of the cylindrical extension 118. A generally horizontal shoulder 132 is formed on the cylindrical extension 118 at the junction between the second and third portions 120 and 121.

Figure 21:
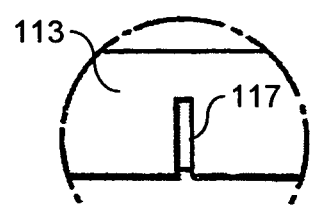
FIG. 21 is a cross-sectional side elevation of a detail of the outer member of FIG. 19 showing a slot.
Figure 22:
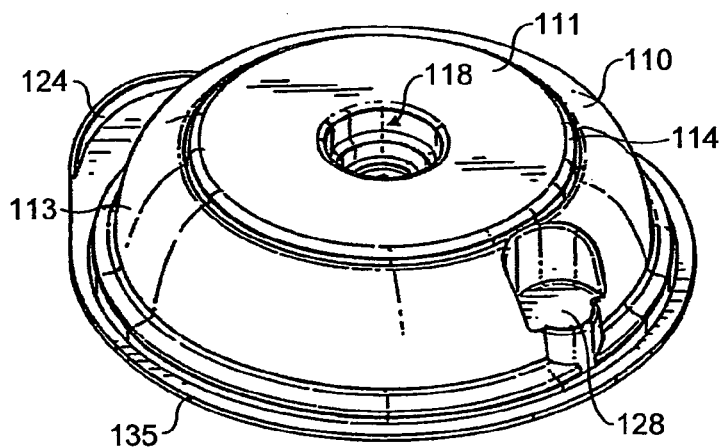
FIG. 22 is a perspective view from above of the outer member of FIG. 19.

An outwardly extending shoulder 133 is formed in the outer member 102 towards the bottom 112. The outwardly extending shoulder 133 forms a secondary wall 115 co-axial with the annular wall 113 so as to define an annular track forming a manifold 116 between the secondary wall 115 and the annular wall 113. The manifold 116 passes around the circumference of the outer member 102. A series of slots 117 are provided in the annular wall 113 level with the manifold 116 to provide gas and liquid communication between the manifold 116 and the interior 134 of the outer member 102. As shown in FIG. 21, the slots 117 comprise vertical slits in the annular wall 113. Between twenty and forty slots are provided. In the embodiment shown thirty-seven slots 117 are provided generally equi-spaced around the circumference of the manifold 16. The slots 117 are preferably between 1.4 and 1.8 mm in length. Typically the length of each slot 117 is 1.6 mm representing 10% of the overall height of the outer member 102. The width of each slot 117 is between 0.25 and 0.35 mm. Typically, the width of each slot 117 is 0.3 mm. The width of the slots 117 is sufficiently narrow to prevent the beverage ingredients passing there through into the manifold 116 either during storage or in use.

An inlet chamber 126 is formed in the outer member 102 at the periphery of the outer member 102. A cylindrical wall 127 is provided, as most clearly shown in FIG. 23, which defines the inlet chamber 126 within, and partitions the inlet chamber 126 from, the interior 134 of the outer member 102. The cylindrical wall 127 has a closed upper face 128 which is formed on a plane perpendicular to the major axis X and an open lower end 129 co-planar with the bottom 12 of the outer member 102. The inlet chamber 26 communicates with the manifold 116 via two slots 130 as shown in FIG. 19. Alternatively, between one and four slots may be used to communicate between the manifold 116 and the inlet chamber 126.

A lower end of the outwardly extending shoulder 133 is provided with an outwardly extending flange 135 which extends perpendicularly to the major axis X. Typically the flange 135 has a width of between 2 and 4 mm. A portion of the flange 135 is enlarged to form a handle 124 by which the outer member 102 may be held. The handle 124 is provided with an upturned rim 125 to improve grip.

The outer member 102 is formed as a single integral piece from high density polyethylene, polypropylene, polystyrene, polyester, or a laminate of two or more of these materials. A suitable polypropylene is the range of polymers available from DSM UK Limited (Redditch, United Kingdom). The outer member may be opaque, transparent or translucent. The manufacturing process may be injection moulding.

Figure 25:
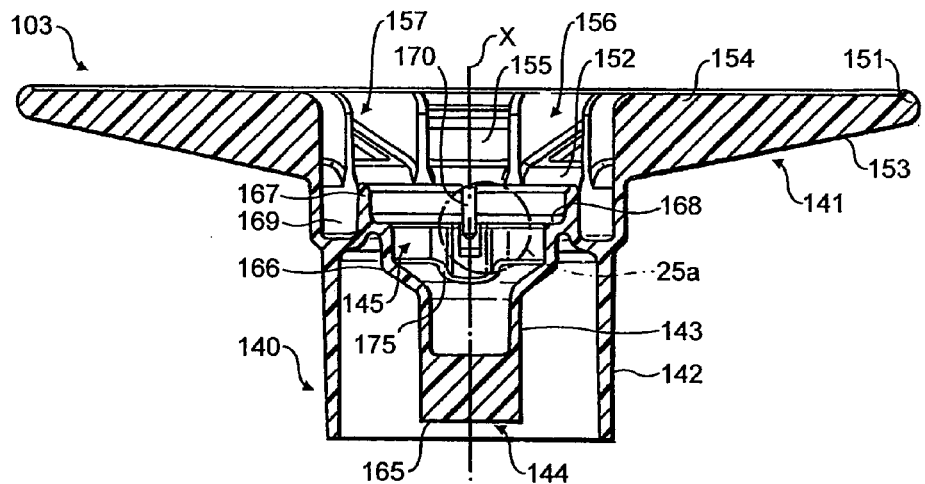
FIG. 25 is a cross-sectional drawing of an inner member of the cartridge.

The inner member 103, as shown in FIGS. 25 to 28, comprises an annular frame 141 and a downwardly extending cylindrical funnel 140. A major axis X passes through the centre of the inner member 103 as shown in FIG. 25.

Figure 26:
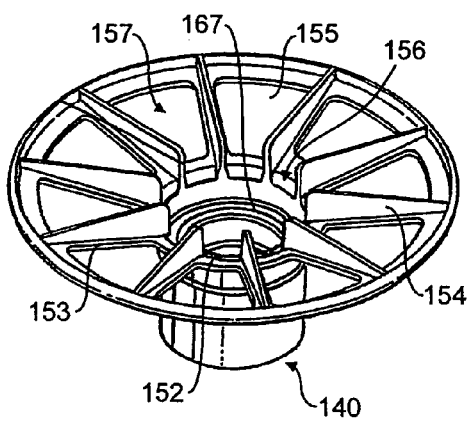
FIG. 26 is a perspective view from above of the inner member of FIG. 25.
Figure 27:
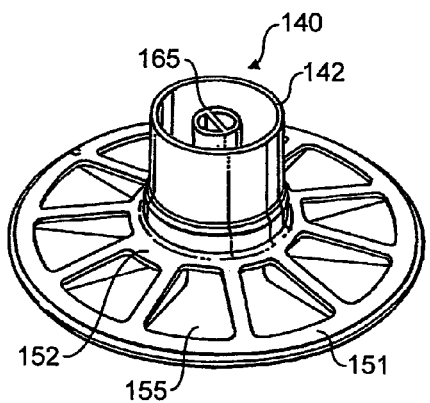
FIG. 27 is a perspective view from above of the inner member of FIG. 25 in an inverted orientation.

As best shown in FIGS. 26 and 27, the annular frame 141 comprises an outer rim 151 and an inner hub 152 joined by ten equi-spaced radial spokes 153. The inner hub 152 is integral with and extends from the cylindrical funnel 140. Filtration apertures 155 are formed in the annular frame 141 between the radial spokes 153. A filter 104 is disposed on the annular frame 141 so as to cover the filtration apertures 155. The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable. The filter 104 may also be treated or coated with a material which is activated by heat and/or pressure so that it can be sealed to the annular frame 141 in this way.

As shown in the cross-sectional profile of FIG. 25, the inner hub 152 is located at a lower position than the outer rim 151, resulting in the annular frame 141 having a sloping lower profile.

The upper surface of each spoke 153 is provided with an upstanding web 154 which divides a void space above the annular frame 141 into a plurality of passages 157. Each passage 157 is bounded on either side by a web 154 and on a lower face by the filter 104. The passages 157 extend from the outer rim 151 downwardly towards, and open into, the cylindrical funnel 140 at openings 156 defined by the inner extremities of the webs 154.

The cylindrical funnel 140 comprises an outer tube 142 surrounding an inner discharge spout 143. The outer tube 142 forms the exterior of the cylindrical funnel 140. The discharge spout 143 is joined to the outer tube 142 at an upper end of the discharge spout 143 by means of an annular flange 147. The discharge spout 143 comprises an inlet 145 at an upper end which communicates with the openings 156 of the passages 157 and an outlet 144 at a lower end through which the prepared beverage is discharged into a cup or other receptacle. The profile of the discharge spout 43 comprises a stepped profile with a distinct dog-leg 166 near an upper end of the tube 143.

As shown in FIG. 25, the discharge spout 143 is provided with a partition 165 which extends part way up the discharge spout 143 from the outlet 144. The partition 165 helps to prevent the beverage spraying and/or splashing as it exits the discharge spout 143.

Figure 25A:
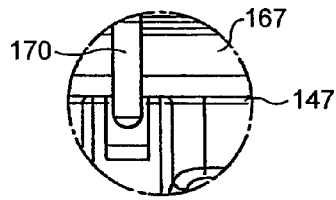
FIG. 25a is a cross-sectional drawing of a detail of the inner member of FIG. 25 showing an aperture.

A rim 167 is provided upstanding from the annular flange 147 joining the outer tube 142 to the discharge spout 143. The rim 167 surrounds the inlet 145 to the discharge spout 143 and defines an annular channel 169 between the rim 167 and the upper portion of the outer tube 142. The rim 167 is provided with an inwardly directed shoulder 168. At one point around the circumference of the rim 167 an aperture 170 is provided in the form of a slot which extends from an upper edge of rim 167 to a point marginally below the level of the shoulder 168 as most clearly shown in FIGS. 25 and 25a. The slot has a width of 0.64 mm.

Figure 28:
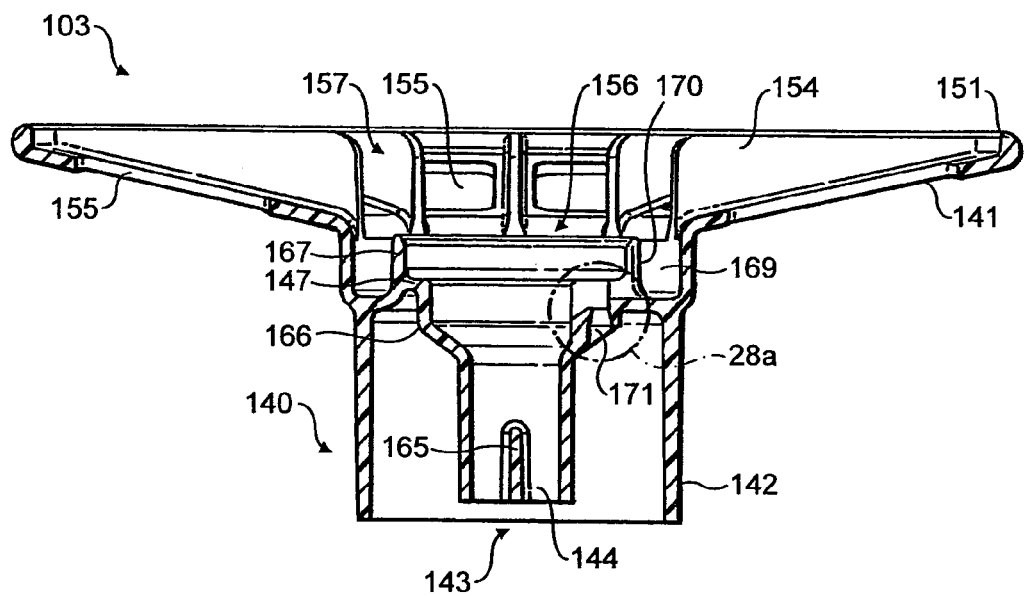
FIG. 28 is another cross-sectional drawing of the inner member of FIG. 25.
Figure 28A:
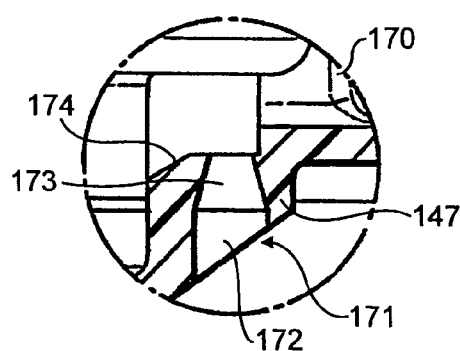
FIG. 28a is a cross-sectional drawing of another detail of the inner member of FIG. 25 showing an air inlet.

An air inlet 171 is provided in annular flange 147 circumferentially aligned with the aperture 170 as shown in FIGS. 28 and 28a. The air inlet 171 comprises an aperture passing through the flange 147 so as to provide communication between a point above the flange 147 and the void space below the flange 147 between the outer tube 142 and discharge spout 143. Preferably, and as shown, the air inlet 171 comprises an upper frusto-conical portion 173 and a lower cylindrical portion 172. The air inlet 171 is typically formed by a mould tool such as a pin. The tapered profile of the air inlet 171 allows the mould tool to be more easily removed from the moulded component. The wall of the outer tube 142 in the vicinity of the air inlet 171 is shaped to form a chute leading from the air inlet 171 to the inlet 145 of the discharge spout 143. As shown in FIG. 28a, a canted shoulder 174 is formed between the air inlet 171 and the chute to ensure that the jet of beverage issuing from the slot 170 does not immediately foul on the upper surface of the flange 147 in the immediate vicinity of the air inlet 171.

The inner member 103 may be formed as a single integral piece from polypropylene or a similar material as described above and by injection moulding in the same manner as the outer member 102.

Alternatively, the inner member 103 and/or the outer member 102 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minn., USA), starch-based polymers, cellulose derivatives and polypeptides.

The laminate 105 is formed from two layers, a first layer of aluminium and a second layer of cast polypropylene. The aluminium layer is between 0.02 and 0.07 mm in thickness. The cast polypropylene layer is between 0.025 and 0.065 mm in thickness. In one embodiment the aluminium layer is 0.06 mm and the polypropylene layer is 0.025 mm thick. This laminate 105 is particularly advantageous as it has a high resistance to curling during assembly. As a result the laminate 105 may be pre-cut to the correct size and shape and subsequently transferred to the assembly station on the production line without undergoing distortion. Consequently, the laminate 108 is particularly well suited to welding. Other laminate materials may be used including PET/Aluminium/PP, PE/EVOH/PP, PET/metallised/PP and Aluminium/PP laminates. Roll laminate stock may be used instead of die cut stock.

The cartridge 100 may be closed by a rigid or semi-rigid lid instead of a flexible laminate 105.

Assembly of the cartridge 100 involves the following steps:
a) the inner member 103 is inserted into the outer member 102;
b) the filter 104 is cut to shape and placed onto the inner member 103 so to be received over the cylindrical funnel 140 and come to rest against the annular frame 141;
c) the inner member 103, outer member 102 and filter 104 are joined by ultrasonic welding;
d) the cartridge 100 is filled with one or more beverage ingredients;
e) the laminate 105 is affixed to the outer member 102.

These steps will be discussed in greater detail below.

The outer member 103 is orientated with the open bottom 112 directed upwards. The inner member 103 is then inserted into the outer member 102 with the outer rim 151 being received as a loose fit in an axial extension 114 at top 111 of the cartridge 100. The cylindrical extension 118 of the outer member 102 is at the same time received in the upper portion of the cylindrical funnel 140 of the inner member 103.

The third portion 121 of the cylindrical extension 118 is seated inside the support rim 167. The shoulder 132 of the cylindrical extension 118 between the second portion 120 and third portion 121 bears against the upper edge of the support rim 167 of the inner member 103. An interface zone is thus formed between the inner member 103 and the outer member 102 comprising a face seal between the cylindrical extension 118 and the support rim 167 which extends around nearly the whole circumference of the cartridge 100. The seal between the cylindrical extension 118 and the support rim 167 is not fluid-tight though since the slot 170 in the support rim 167 extends through the support rim 167 and downwardly to a point marginally below the shoulder 168. Consequently the interface fit between the cylindrical extension 118 and the support rim 167 transforms the slot 170 into an aperture providing gas and liquid communication between the annular channel 169 and the discharge spout 143. The aperture is typically 0.64 mm wide by 0.69 mm long.

The filter 104 is then placed over the inner member 103 such that the filter material contacts the annular rim 151. An ultrasonic welding process is then used to join the filter 104 to the inner member 103 and at the same time, and in the same process step, the inner member 103 to the outer member 102. The inner member 103 and filter 104 are welded around the outer rim 151. The inner member 103 and outer member 102 are joined by means of weld lines around the outer rim 151 and also the upper edges of the webs 154.

Figure 29:
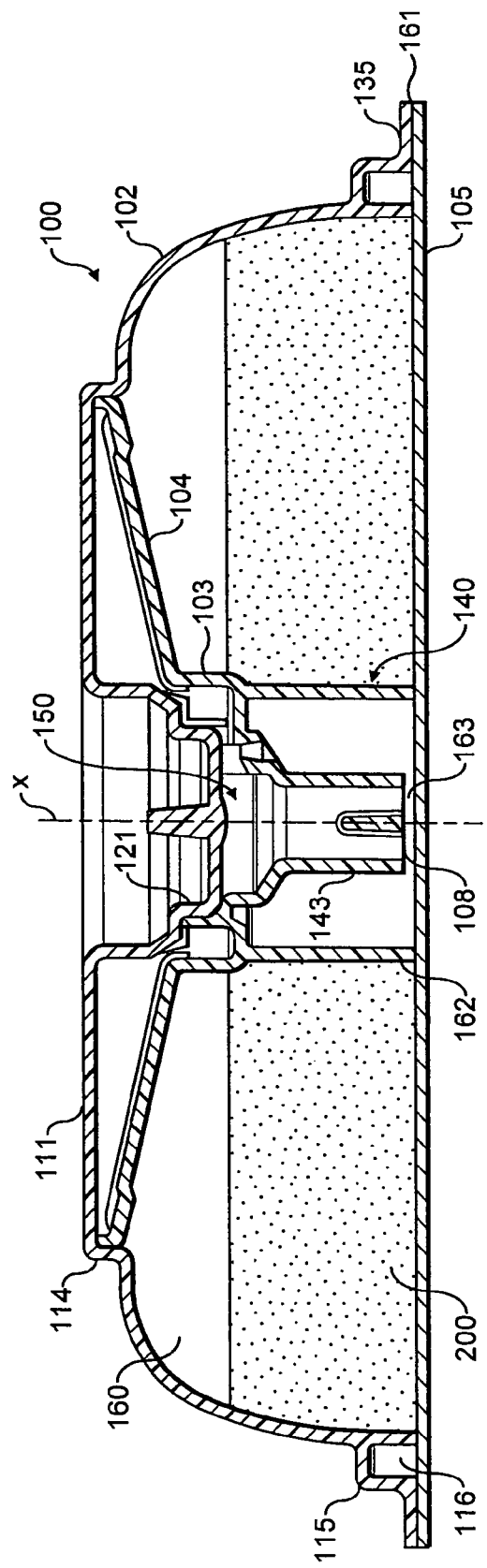
FIG. 29 is a cross-sectional side elevation of the cartridge in an assembled condition.

As shown most clearly in FIG. 29, the outer member 102 and inner member 103 when joined together define a void space in the interior 106 below the annular flange 141 and exterior the cylindrical funnel 140 which forms a filtration chamber. The filtration chamber 160 and passages 157 above the annular frame 141 are separated by the filter paper 104.

The filtration chamber 160 contains the one or more beverage ingredients 200. The one or more beverage ingredients 200 are packed into the filtration chamber 160. For an espresso-style beverage the ingredient is typically roast and ground coffee. The density of packing of the beverage ingredients in the filtration chamber 130 can be varied as desired. Typically, for a filtered coffee product the filtration chamber contains between 5.0 and 10.2 grams of roast and ground coffee in a filtration bed of thickness of typically 5 to 14 mm. Optionally, the interior 106 may contain one or more bodies, such as spheres, which are freely movable within the interior 106 to aid mixing by inducing turbulence and breaking down deposits of beverage ingredients during discharge of the beverage.

The laminate 105 is then affixed to the outer member 102 by forming a weld 161 around the periphery of the laminate 105 to join the laminate 105 to the lower surface of the outwardly extending flange 135. The weld 161 is extended to seal the laminate 105 against the lower edge of the cylindrical wall 127 of the inlet chamber 126. Further, a weld 162 is formed between the laminate 105 and the lower edge of the outer tube 142 of the cylindrical funnel 140. The laminate 105 forms the lower wall of the filtration chamber 160 and also seals the inlet chamber 126 and cylindrical funnel 140. However, a small gap 163 exists prior to dispensation between the laminate 105 and the lower edge of the discharge spout 43. A variety of welding methods may be used, such as heat and ultrasonic welding, depending on the material characteristics of the laminate 105.

Advantageously, the inner member 103 spans between the outer member 102 and the laminate 105. The inner member 103 is formed from a material of relative rigidity, such as polypropylene. As such, the inner member 103 forms a load-bearing member that acts to keep the laminate 105 and outer member 102 spaced apart when the cartridge 100 is compressed. It is preferred that the cartridge 100 is subjected to a compressive load of between 130 and 280N in use. The compressive force acts to prevent the cartridge failing under internal pressurisation and also serves to squeeze the inner member 103 and outer member 102 together. This ensures that the internal dimensions of passageways and apertures in the cartridge 100 are fixed and unable to change during pressurisation of the cartridge 100.

In use the water, under pressure, enters the cartridge 100 through the inlet 107 into the inlet chamber 126. From there the water is directed to flow through the slots 117 and round the manifold 116 and into the filtration chamber 160 of the cartridge 1 through the plurality of slots 117. The water is forced radially inwardly through the filtration chamber 160 and mixes with the beverage ingredients 200 contained therein. The water is at the same time forced upwardly through the beverage ingredients 200. The beverage formed by passage of the water through the beverage ingredients 200 passes through the filter 104 and filtration apertures 155 into the passages 157 lying above the annular frame 141.

Beverage in the radial passages 157 flows downwardly along the passages 157 formed between the webs 154 and through the openings 156 and into the annular channel 169 of the cylindrical funnel 140. From the annular channel 169 the beverage is forced under pressure through the aperture 128 by the back pressure of beverage collecting in the filtration chamber 160 and passages 157. The beverage is thus forced through aperture as a jet and into an expansion chamber formed by the upper end of the discharge spout 143. As shown in FIG. 29, the jet of beverage passes directly over the air inlet 171. Passage of the beverage through the restriction of the aperture causes the pressure of the beverage to be reduced. As the beverage enters the discharge spout 143 the pressure of the beverage is still relatively low. As a result air is entrained into the beverage stream in the form of a multitude of small air bubbles as the air is drawn up through the air inlet 171. The jet of beverage issuing from the aperture is funneled downwards to the outlet 144 where the beverage is discharged into a receptacle such as a cup where the air bubbles form the desired crema. Thus, the aperture and the air inlet 171 together form an eductor which acts to entrain air into the beverage. Flow of beverage into the eductor should be kept as smooth as possible to reduce pressure losses. It should be noted, however, that in a high pressure state, this mechanism of air education is de-activated.

The sealing of the filter 104 onto the spokes 153 and the welding of the rim 151 with the outer member 102 ensures that there are no short-circuits and all the beverage has to pass through the filter 104.

Figure 30:
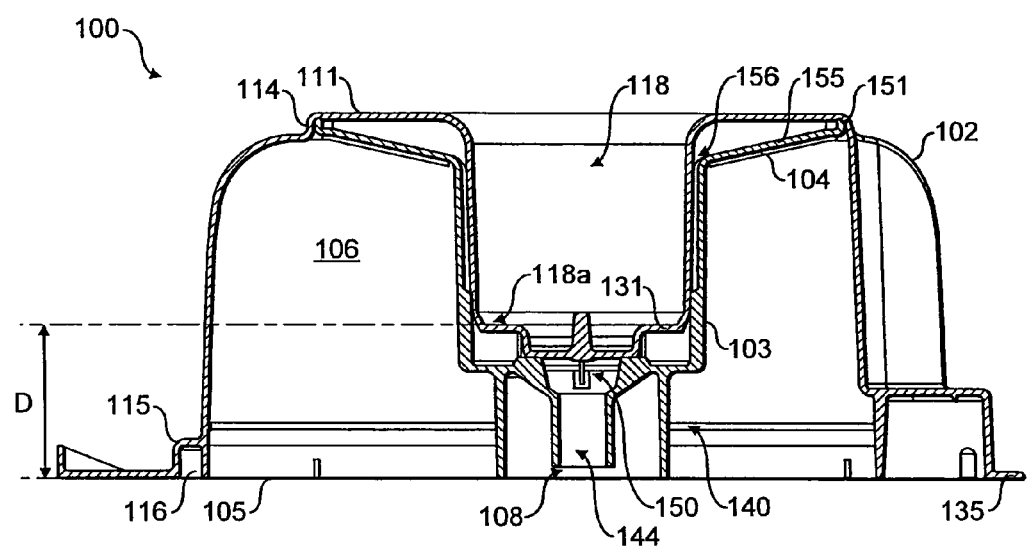
FIG. 30 is a cross-sectional side elevation of another version of cartridge.

FIG. 30 shows a second embodiment of beverage cartridge 100 which can be used in the beverage preparation machine 10 of the present invention. Like components between the first and second embodiments have been referenced with like numerals. Many of the components and functions of the second embodiment of cartridge 100 are the same as for the first embodiment. However, it can be seen from FIG. 30 that the cartridge 100 has a greater overall height compared to the cartridge 100 shown in FIG. 29. The outer member 102 is taller and thereby defines a larger void space in which a larger quantity of beverage ingredients 200 can be stored. The second embodiment of cartridge 100 is therefore suitable for dispensing larger volumes of beverage. The diameter of the outer member 102 and cartridge 100 are the same as in the first embodiment. Typically the storage volume of the cartridge 100 when assembled is 50 to 58 ml ±20%. As with the first embodiment, the upper surface of the outer member 102 is provided with a recess having a clamping surface 118 located at a bottom thereof. According to the present invention, the separation D between surface 118a and the underside of the laminate 105 is the same as for the first embodiment. As a result, the elongated recess extends approximately 60% of the distance towards the laminate 105. This advantageously allows for a simplified clamping arrangement to be used as described below.

Also, the second embodiment of cartridge 100 lacks an eductor air inlet 171.

The first and second embodiments of cartridge 1 described above are given as examples of an "eductor" type of cartridge and a "non-eductor" type cartridge which may be used with the improved beverage preparation machine described above.

The invention claimed is:
1. A beverage preparation machine for preparing beverages from a cartridge containing one or more beverage ingredients, the machine comprising:
    a cartridge recognition device for determining the type of beverage to be prepared from a cartridge inserted into the machine;
    a variable geometry valve, said valve being a ball valve having a rotating valve element rotatable within a chamber between preset positions, said valve being located downstream of a cartridge when inserted in the machine, the valve being configured to prepare beverages at a range of pressures by having at least an open position and at least one restricted flow position; and a controller for automatically selecting an initial position of the rotating valve element and automatically controlling the subsequent position of the rotating valve element during the beverage preparation cycle according to the pressure requirements of the beverage preparation cycle for the type of beverage determined by the cartridge recognition device.

2. The beverage preparation machine as claimed in claim 1, wherein the variable geometry valve additionally has a closed position preventing flow.

3. The beverage preparation machine as claimed in claim 1, wherein the variable geometry valve additionally has a purge position for diverting purge waste away from a dispensing area.

4. The beverage preparation machine as claimed in claim 1, wherein the controller is programmed to change the variable geometry valve position during the preparation of the beverage according to pressure requirements of the beverage preparation cycle for the type of beverage determined by the cartridge recognition device.

5. The beverage preparation machine as claimed in claim 1, wherein the restricted flow position of the variable geometry valve is configured to create a back pressure in the cartridge of 2 to 9 bar.

6. The beverage preparation machine as claimed in claim 1, wherein the controller is programmed to change the variable geometry valve position during the preparation of the beverage according to flow requirements of the beverage preparation cycle for the type of beverage determined by the cartridge recognition device.

* * * * *